United States Patent [19]
Murano

[11] Patent Number: 6,166,757
[45] Date of Patent: Dec. 26, 2000

[54] LED HEAD

[75] Inventor: Shunji Murano, Yokaichi, Japan

[73] Assignee: Kyocera Corporation, Kyoto, Japan

[21] Appl. No.: 08/675,287

[22] Filed: Jul. 1, 1996

[30]  Foreign Application Priority Data

Jun. 30, 1995 [JP] Japan ................................. 7-188422
Jul. 28, 1995 [JP] Japan ................................. 7-212579

[51] Int. Cl.⁷ ....................................... B41J 2/47
[52] U.S. Cl. ......................... 347/240; 347/237; 347/145
[58] Field of Search .................................. 347/236, 237,
347/238, 240, 129, 130, 131, 132, 133,
143, 145, 12, 13, 15, 183, 186; 358/298,
296, 300, 302

[56]   References Cited

U.S. PATENT DOCUMENTS

| | | | |
|---|---|---|---|
| 4,074,318 | 2/1978 | Kapes, Jr. ............................... | 358/457 |
| 4,689,694 | 8/1987 | Yoshida .................................. | 358/298 |
| 4,764,778 | 8/1988 | Spektor et al. ......................... | 347/255 |
| 4,814,886 | 3/1989 | Kuge et al. ............................. | 347/237 |
| 4,897,672 | 1/1990 | Horiuchi et al. ........................ | 347/236 |
| 4,916,530 | 4/1990 | Neilson et al. ......................... | 358/75 |
| 4,928,118 | 5/1990 | Leksell et al. .......................... | 347/241 |
| 5,062,002 | 10/1991 | Dahlquist et al. ..................... | 358/298 |
| 5,124,726 | 6/1992 | Morton et al. ......................... | 347/240 |
| 5,193,011 | 3/1993 | Dir et al. ................................ | 347/240 |
| 5,233,337 | 8/1993 | Takahashi .............................. | 347/237 |
| 5,671,002 | 9/1997 | Murano .................................. | 342/237 |
| 5,818,501 | 10/1998 | Ng et al. ................................ | 347/240 |
| 5,874,942 | 2/1999 | Walker .................................... | 345/158 |

*Primary Examiner*—N. Le
*Assistant Examiner*—Lamson D. Nguyen
*Attorney, Agent, or Firm*—Hogan & Hartson, LLP

[57]   ABSTRACT

Gray scale printing data with compensation for dispersion is stored in a first shift register, the data is sliced into respective bits and is fetched by means of a second shift register and AND-gates. Standard resistances are scanned by means of a third shift register and switches, in synchronization with the data retrieval, for changing standard current, and light emitting current to light emitting bodies is changed according to the standard current.

15 Claims, 23 Drawing Sheets

LED HEAD

TITLE OF THE INVENTION

1. Field of the Invention

The present invention relates to an LED head capable of the compensation for inter-block and inner-block dispersions on the outputs of light emitting bodies, and in particular, to an LED head for gray scale printing with the compensation.

2. Prior Art

Gray scale printing has been required to LED heads as well as to other print heads. A most simple method for gray scale printing is to change the emission period of each light emitting body according to gray scale printing data. A method for that purpose was proposed in Japanese patent Hei 6-30891 for thermal heads, there, a counter was provided for every printing dot, or pixel, and printing data was preset to the counters before printing. The counters were decremented by one with an enable clock signal during printing, and printing operation was performed until the counter values became zero. However, according to the method, one counter is necessary for every dot, and the gate number in the control circuit increases.

Further, it was proposed to change light emitting current according to printing data in Japanese Provisional Patent Publication Hei 3-61555; there plural current sources were provided, and their output currents were superimposed for gray scale printing. However, this required both plural current sources which could be driven simultaneously and independently, and transistors with which the output currents of the current sources were imposed without mutual interference, and therefore, a complicated power supply circuit was necessary.

SUMMARY OF THE INVENTION

The object of the present invention is to provide a new method for gray scale printing with the compensation of dispersion in an LED head, and in particular, to achieve gray scale control and dispersion compensation by means of a simple circuit.

The LED head according to the invention has plural blocks each having plural light emitting bodies and comprises: a memory for storing printing data for each light emitting body or dispersion compensation data between blocks in BCD code system; fetching means for fetching said data stored in said memory with bit slicing; at least a current source for supplying light emitting current to respective light emitting bodies. And said light emitting current is scannable and is changed in size according to the significance of each bit in BCD code system; and said head is further provided scanning means for scanning said current source in synchronization with the bit slicing by said fetching means.

Preferably, said current source comprises a reference current generator; plural standard resistances for changing an output current of the reference current generator; and a plurality of mirror constant current supplies for supplying light emitting current to respective light emitting bodies according to the output current of the reference current generator.

Preferably, said memory stores both gray scale printing data for each light emitting body and dispersion compensation data for each light emitting body in each block, and said fetching means is configured to fetch said gray scale printing data and said dispersion compensation data one bit by one bit serially, and said scanning means scans said current source plurally in correspondence with said gray scale printing data and said dispersion compensation data.

Preferably, the LED head further comprises: a memory for storing dispersion compensation data between blocks in BCD code system; and fetching means for fetching said dispersion compensation data between blocks with bit slicing, stored in said memory for storing dispersion compensation data between block. And said scanning means scans said current source plurally in correspondence with said gray scale printing data, said dispersion compensation data for each light emitting body in each block, and said dispersion compensation data between blocks.

The LED head according to the invention has plural blocks each having plural light emitting bodies and comprises: a memory for storing printing data for each light emitting body or dispersion compensation data between blocks in BCD code system; a pulse generating means for generating plural pulses which are changed in width according to the significance of each bit in said BCD code system; fetching means for fetching said data stored in said memory with bit slicing in synchronization with said pulses of the pulse generating means; and at least a current source for supplying light emitting current to each light emitting body during periods in correspondence with the pulse widths.

Preferably, said memory stores both gray scale printing data for each light emitting body and dispersion compensation data for each light emitting body in a block, and said pulse generating means is configured to generate the set of said plural pulses plurally in correspondence with said gray scale printing data and said dispersion compensation data for each light emitting body in a block.

Preferably, a memory is provided for storing dispersion compensation data between blocks in BCD code system, and said pulse generating means is configured to generate said set of said plural pulses plurally in correspondence with said gray scale printing data, said dispersion compensation data for each light emitting bodies in a block, and said dispersion compensation data between blocks.

The LED head according to the invention has plural blocks each having plural light emitting bodies and comprises: a first memory for storing dispersion compensation data between light emitting bodies in a block; a second memory for storing dispersion compensation data between blocks; a third memory for storing gray scale printing data for each light emitting bodies; fetching means for fetching respective data stored in the said respective memories; at least a variable current supply for supplying light emitting current to each light emitting body; current control means for changing said light emitting current by controlling said variable current supply according to the fetched data in said first memory and said second memory; and light emitting time control means for controlling periods of said light emitting current of said variable current supply according to the fetched data in said third memory.

Preferably, each of said first, second and third memories stores respective data in BCD code system, said fetching means is configured to fetch respective data serially in a time divisional mode one bit by one bit, said variable current supply is configured in such a manner that said light emitting current changes according to the significance of each bit in said BCD code system by the control of said current control means controls, said light emitting time control means comprises at least a pulse generating circuit for generating pulses which change in width according to the significance of each bit of the data fetched from the third memory, and said variable current supply supplies substantially constant light emitting current during said pulses.

According to the present invention, printing data for each light emitting body or dispersion compensation data between blocks is stored in BCD code system. Namely, these data have the significance changing by two times for each bit such as 1:2:4: and so on, in the system. In correspondence with this, the current supply or the pulse generating means is scanned so that the output current is changed in the magnitude thereof or in the duration period thereof. The above change corresponds to the significance of each bit in the BCD code system, and therefore, changes by two times such as 1:2:4: and so on, for each bit are preferable. Therefore, the light emitting current or the light emitting period is controlled with the resolution determined by the code length in the BCD code system. The data in the system is sliced into each bit and fetched by one bit, and in synchronization with this, the current supply or the pulse generating means is scanned.

Supplementing the functions of the invention, the current source is scanned, and light emitting currents from plural sources are not superimposed. Therefore, one current source system is substantially enough for the control, since the output current of the source is controllable with the scan. Of course, transistors for superimposing output currents from plural sources are un-necessary. Since the light emitting current changes according to the significance of each bit in the BCD code system, luminous energy at a light emitting current is determined by the product of the magnitude of the current and the value of relevant bit, 0 or 1, in the BCD code system. The current changes during the scan, and therefore, total luminous energy is determined by the sum of said products. According to the invention, the data in the memory is fetched by every bit with bit slicing. In synchronization with this, the current is changed during the scan, and therefore, the total luminous energy is changed. When a standard current generator and at least a mirror constant current supply are provided, standard current is changed with the scan of plural standard resistances, and therefore, one current supply is literally enough for the control.

According to the invention, the scan is made with the pulse width being changed according to the BCD code system, and the output of each light emitting body is determined by the product of the pulse width and the data of the BCD code corresponding to the pulse. There are plural pulses, and the overall light emitting period is the sum of the above product. According to the invention, data stored in a memory is read by eery bit with bit slicing, and the pulse width is changed in synchronization with the data fetching. Therefore, counters for respective light emitting bodies are not necessary, and the necessary gate number of control circuit decreases.

When both gray scale printing and dispersion compensation are performed, these data may, for example, be added for synthesis and then performed. However, data for dispersion compensation are constant for printing, and therefore, it is preferable to sever gray scale printing data and dispersion compensation data. This means that gray scale printing and dispersion compensation may be dealt with and performed separately with simpler data processing. In particular, when the three types of processing of gray scale printing, dispersion compensation in a block, and dispersion compensation between blocks are performed, the data for inter-block dispersion compensation is one for each block not but for each light emitting body, while other data are for each light emitting body, and therefore, the data for inter-block dispersion compensation is preferably stored in a distinct memory and processed distinctly.

According to the invention, dispersion compensation data for inner-block dispersion is stored in a first memory, dispersion compensation data for inter-block dispersion is stored in a second memory, and gray scale printing data is stored in a third memory, Further, light emitting current is controlled by controlling a variable current supply in accordance with the inner-block dispersion compensation data and the inter-block dispersion compensation data. Moreover, the light emitting period is controlled according to gray scale printing data. Therefore, the dispersion compensation and the gray scale printing are performed separately, and dispersion compensation is performed separately for inter-block dispersion and for inner-block dispersion. Of course, the synthesis of dispersion compensation data and gray scale printing data is not required.

Preferably, inner-block dispersion compensation, inter-block dispersion compensation, and gray scale printing are performed separately, while operational period is divided and allocated to the above three. The dispersion compensations are performed by changing the light emitting current in accordance with the significance of each bit in the BCD code system, and gray scale printing is performed by changing each pulse width in accordance with the significance of each bit of the gray scale printing data in the BCD code system.

Therefore, according to the invention, gray scale printing is performed with one current supply system.

According to the invention, gray scale printing is performed by scanning standard resistances, and therefore, plural current sources are not required.

According to the invention, gray scale printing and dispersion compensation are performed separately, and therefore, the synthesis of gray scale printing data and dispersion compensation data is not required.

According to the invention, gray scale printing, inner-block dispersion compensation, and inter-block dispersion compensation are performed separately, and therefore, their data synthesis is not required.

According to the invention, counters for respective light emitting bodies are unnecessary, and therefore, a control circuit with less gates is usable.

According to the invention, dispersion compensation for and gray scale printing by an LED head are accurately performed with a simple circuit, and in particular, inner-block dispersion compensation, inter-block dispersion compensation, and gray scale printing are performed separately.

EMBODIMENTS

Figure 1:
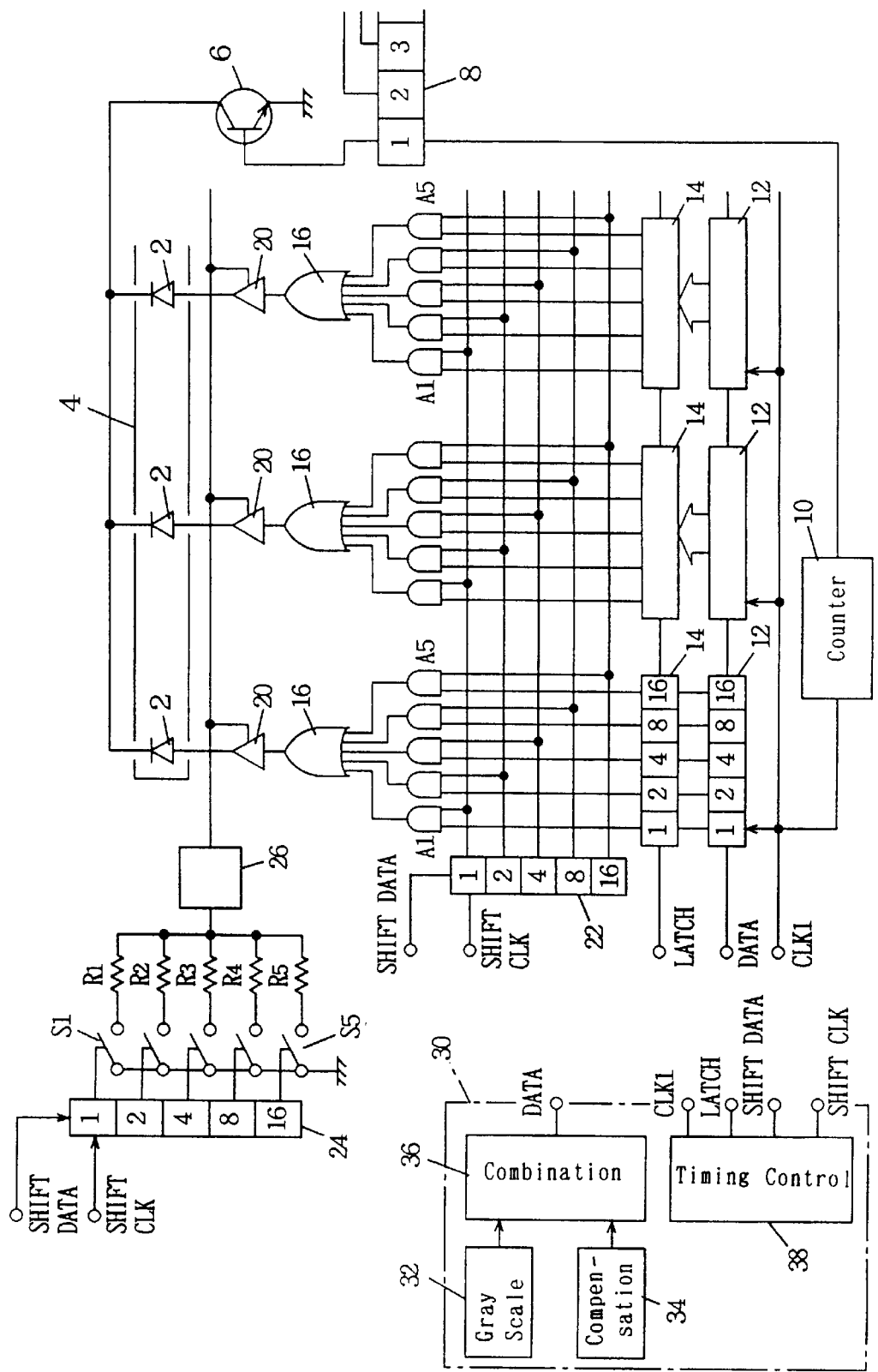
FIG. 1 shows the circuit, in part, of the LED head according to a first embodiment.

FIGS. 1–24 show embodiments and their versions. FIG. 1 to FIG. 6 show a first embodiment, in embodiments and versions shown in FIGS. 1–24, similar symbols indicate the same, and the description of the first embodiment is applicable also to other embodiments and versions, unless otherwise specified. In FIG. 1, 2 indicates respective light emitting bodies, and for example, every 64–128 pieces of the light emitting bodies 2 constitutes an LED array 4. Each LED array 4 is called a block, and for instance, 40 blocks are provided for an LED head. Compensation between blocks are necessary for gray scale printing, since dispersion of outputs between blocks is remarkable in LED heads. While plural LED arrays 4 or blocks may be driven dynamically or statically, in the embodiments, they are driven dynamically. 6 indicates cathode drive transistors for driving LED arrays 4 by one block in series. 8 indicates a cathode drive IC for turning the cathode drive transistors 6 on one by one in series. 10 indicates a counter for counting a clock signal CLK1, for example, from an un-shown printer main body and for controlling the cathode drive IC 8 with counting the clock signal for detecting block changes.

12 indicates shift registers for storing gray scale printing data; each stores the data of five bit width for 32 gray scales for a light emitting body in BCD code system. 14 indicates latch circuits, 16 OR-gates, A1–A5 AND-gates, 22 and 24 shift registers of, for example, 5 bit width, and S1–S5 switches. Indicated by R1–R5 are standard resistances, and 26 is a reference current generator. The mirror constant current supplies 20 provide light emitting current equal to the output current of the reference current generator 26 for each light emitting body.

Indicated by 30 is a printing data generator, which is provided in a printer main body, in a facsimile main body or in a copy machine main body, or provided in the LED head. Printing data generator 30 has a gray scale data generator 32 for generating gray scale printing data for each light emitting body 2, a dispersion compensation data generator 34 for compensating dispersions between light emitting bodies 2 and between LED arrays 4, a combination means 36 for combining these data, and a timing control 38. The gray scale data generator 32 generates the data in BCD code system, which represents the light emitting current of each light emitting body 2. The compensation data generator 34 generates compensation data necessary to compensate inter-block output dispersion between the LED arrays and inner-block output dispersion between the light emitting bodies 2 in a block to the average output in the block in BCD code system. The combination means 36 combines them by summing up. The resultant is the data in BCD code system representing the light emitting current for gray scale printing to be applied to each light emitting body 2 after the dispersion compensation.

These data are inputted to the shift registers 12. The timing control 38 generates a clock signal CLK1 for the input of the printing data to the shift registers 12, a latch signal for inputting the data into the latch circuits 14, a shift clock signal for making the data in the shift registers shift, and shift data for setting a shift-bit at the head bit (LSB) of the shift register 24.

The counter 10 counts the clock signal CLK1, and upon the counting of the signal for one block, modifies the data in the cathode drive IC 8, for driving a next block. The data in the shift registers 12 are inputted to the latch circuits 14 with the latch signal, and in synchronization with the shift of the data bit in the shift register 22 by the shift clock, are fetched by every one bit with bit slicing by means of the AND-gates A1–A5. The AND-gates A1–A5 and the shift register 22 constitute a fetching means for fetching data with bit slicing.

The fetched data are applied to the mirror constant current supplies 20 through the OR-gates 16, and the switches S1–S5 are scanned in series with the data-bit in the shift register 24 for the scanning being shifted. As a result, a standard current inputted to the mirror constant current supplies 20 changes into the 5 kinds of 1 mA, 2 mA, 4 mA, 8 mA, and 16 mA, for example. Thus, the light emitting bodies 2 are driven with currents corresponding to their gray scale printing data in BCD code system with the compensation for inner-block and inter-block dispersions. Therefore, for example, 32 gray scale printing is performed according to the embodiment.

Figure 2:
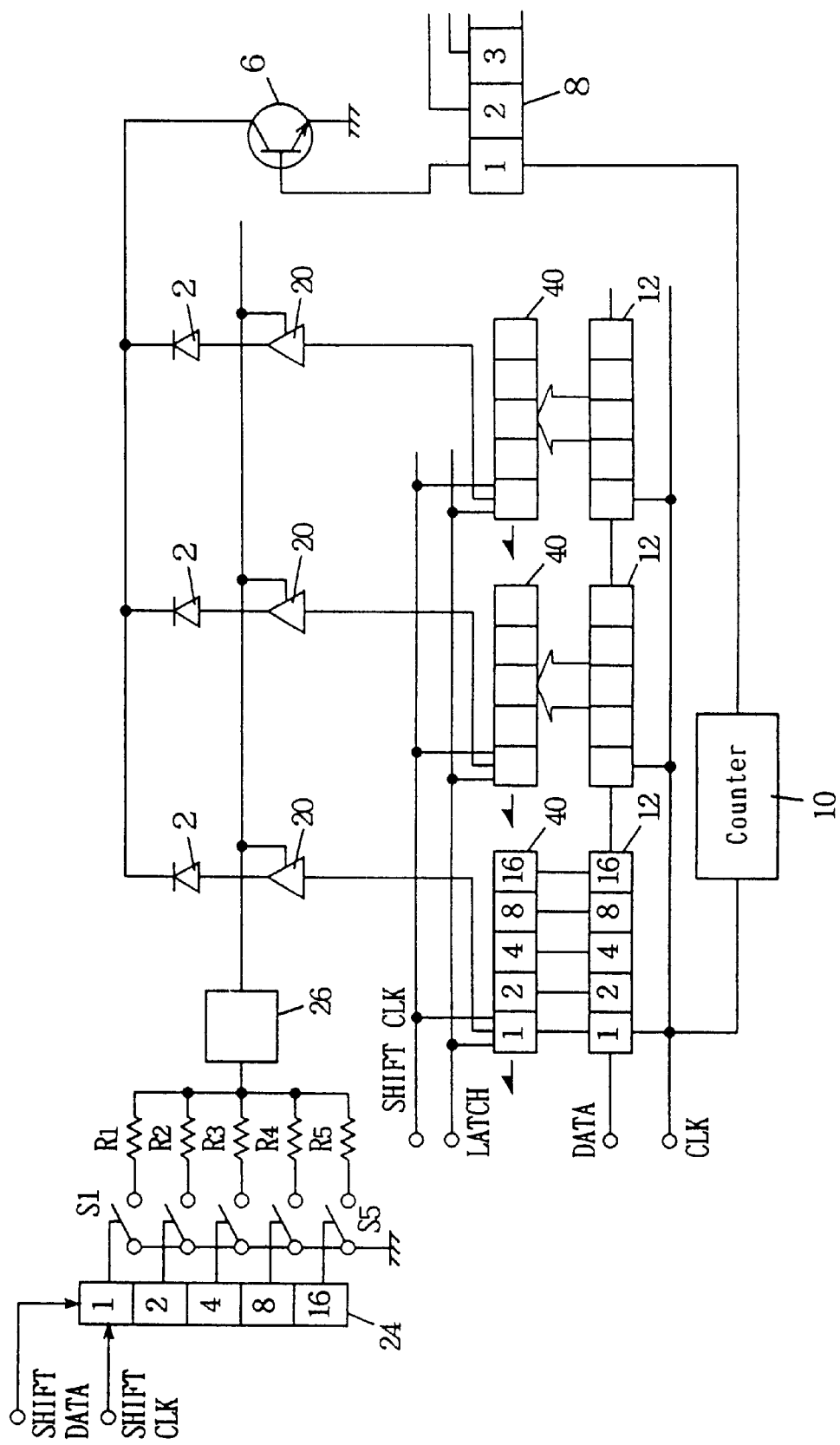
FIG. 2 shows a version, in part, of the circuit according to the first embodiment.

FIG. 2 shows a version of the LED head shown in FIG. 1 indicated by 40 are shift registers of parallel input and of serial output, and data in the shift registers 40 are sequentially shifted one bit left with every shift clock signal for fetching the data in the order from the least significant bit to the most significant bit. Thus, by means of the shift registers 40 in place of the AND-gates A1–A5, in synchronization with the scanning of the standard resistances R1–R5 by the shift register 24, data are fetched by one bit with bit slicing. The light emitting bodies 2 are driven according to the fetched data with the driving current equal to the standard current from the reference current generator 26.

According to the embodiment shown in FIG. 1, the resultant light emitting current is determined by the addition of the gray scale printing data, the inter-block dispersion compensation data, and the inner-block dispersion compensation data representing the dispersion of each light emitting body 2 to the average output in the block, all for each light emitting body. The data of resultant light emitting current is in BCD code system and fetched from the latch circuit 14 by one bit.

Figure 3:
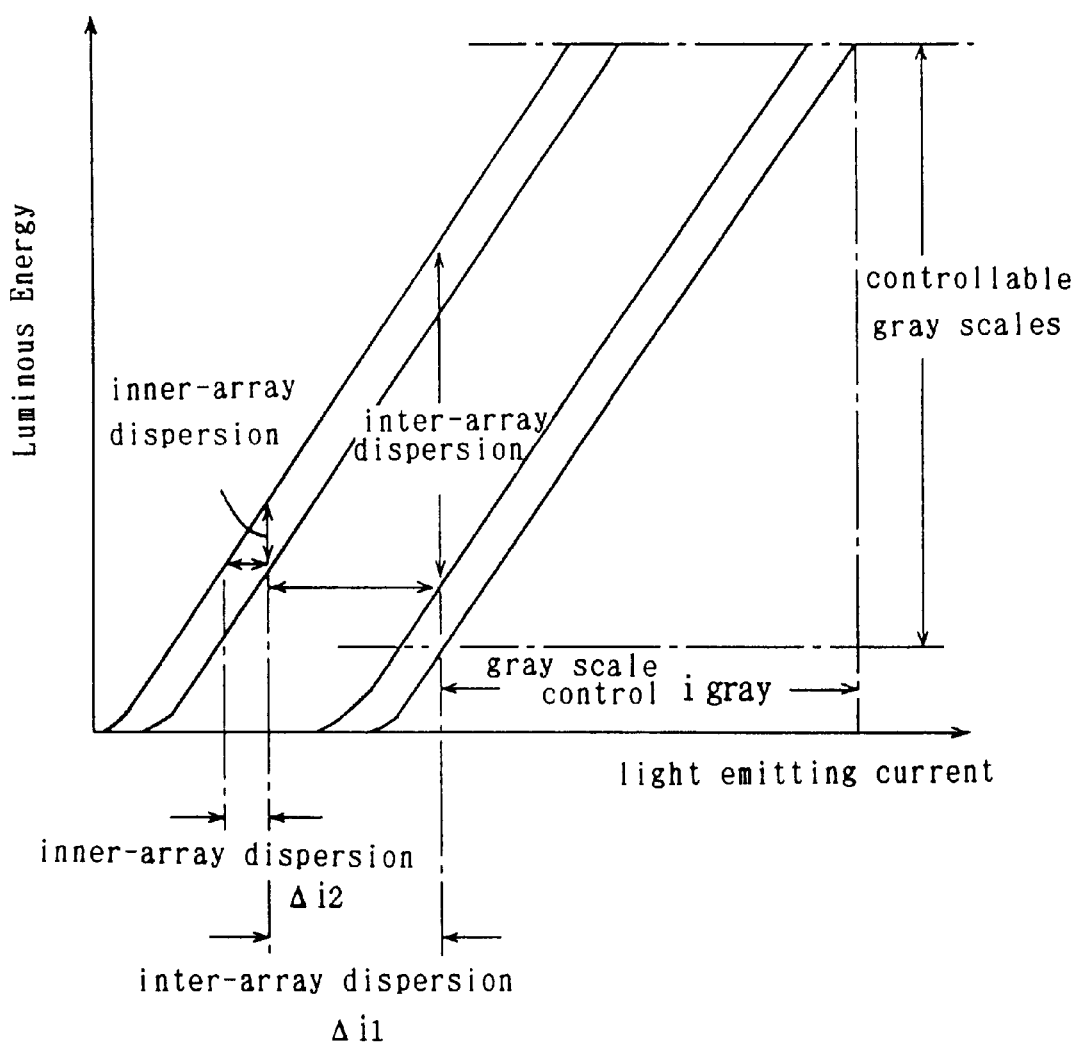
FIG. 3 is a characteristic diagram showing the principle of gray scale printing and inter-block and inner-block dispersion compensations, according to the first embodiment.

Luminous energy and light emitting current in an LED array 4 has a relation shown in FIG. 3, which makes the above control possible. In the figure, the abscissa shows light emitting current of a light emitting body, and the ordinate shows the luminous energy. In LED heads, inter-array output-dispersion $\Delta i1$ is significant, and inner-array output-dispersion $\Delta i\,2$ is also large. While the luminous energy changes according to these dispersions as shown by four solid lines, compensation $\Delta i1$ for inter-array dispersion and compensation $\Delta i2$ for inner-array dispersion are added, and then, gray scale printing current i gray is added for getting the light emitting current to be added. Therefore, the dispersions between the arrays 4 and in an array 4 are compensated, and the luminous energy is controlled, for example, in 32 gray levels.

Figure 4:
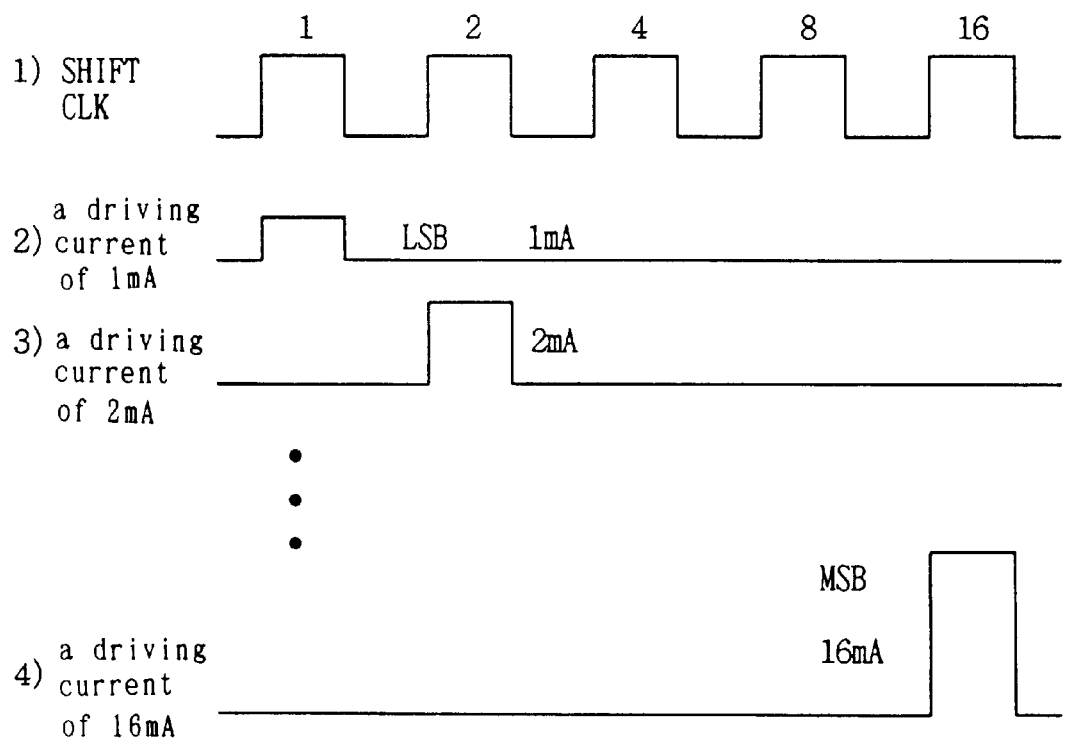
FIG. 4 is a wave form diagram of the embodiment.

FIG. 4 shows the operational waveforms in the embodiment. Corresponding to the 32 gray levels of five bits in BCD code system, the shift clock has weights of 1, 2, 4, 8, and 16, standard resistances R1–R5 are scanned in the order with the shift clock, and for example, the output current of reference current generator 26 changes among five kind outputs of 1 mA–16 mA. Since each light emitting body 2 is driven by means of the mirror constant current supply 20, the driving current is equal to the standard current, and each light emitting body 2 is driven by the current according to the gray scale printing data in BCD code system.

Figure 5:
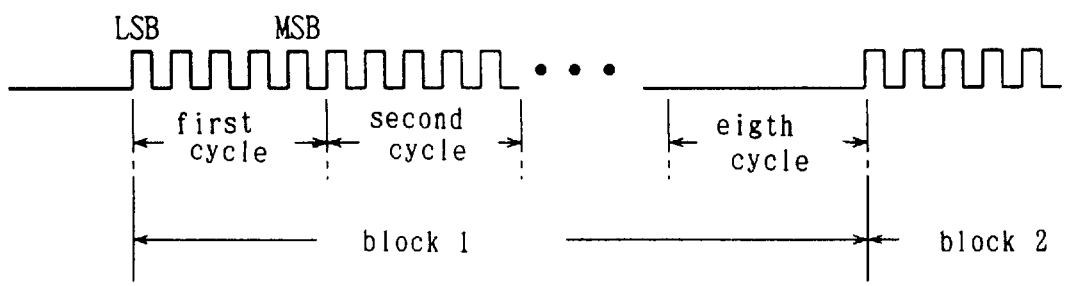
FIG. 5 is a wave form diagram of a version, where an LED head according to the embodiment is differently driven.

While in the embodiment of FIG. 1, the dispersion compensation data both between light emitting bodies 2 and between blocks are generated by the compensation data generator 34, the compensation of the inter-block dispersion and the compensation of the inner-block dispersion may be independently dealt with. FIG. 5 shows an example for the compensation for inter-block dispersion with 8 levels, an operation of a block being divided into 8 cycles, the block having the minimum mean output being driven during all the cycles, and the block having the maximum output is driven only for one cycle. Thus, the light emitting period changes into 8 levels with the cycles. According to this version, the compensation data generator 34 generates only the inner-block dispersion compensation data, and the timing control 38 changes the number of shift clocks without changing the number of clocks CLK1 per a block.

Figure 6:
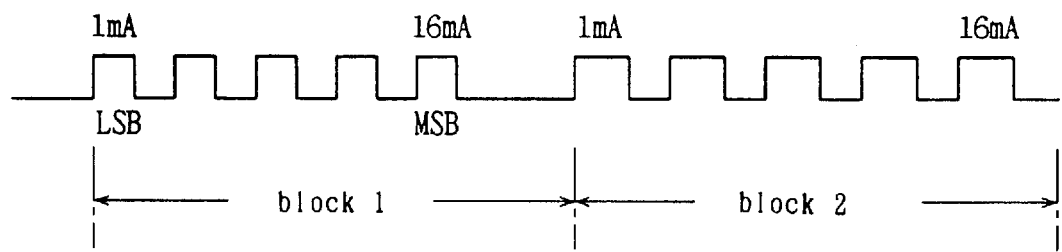
FIG. 6 is a wave form diagram of a version where an LED head according to the invention is further differently driven.

Similarly, when the frequency of shift clock is changed at every block 4, it is possible to compensate the inter-block dispersion. Waveforms for the operation of the present version are shown in FIG. 6, and driving time of each block is changed for the compensation, within the range of the maximum driving time allocated to each block in the dynamic drive. For this object, the compensation data generator 34 generates only the dispersion compensation data for each light emitting body 2, and the inter-block dispersion is compensated by the change in the shift clock frequency caused by the timing control 38.

EMBODIMENT 2

Figure 7:
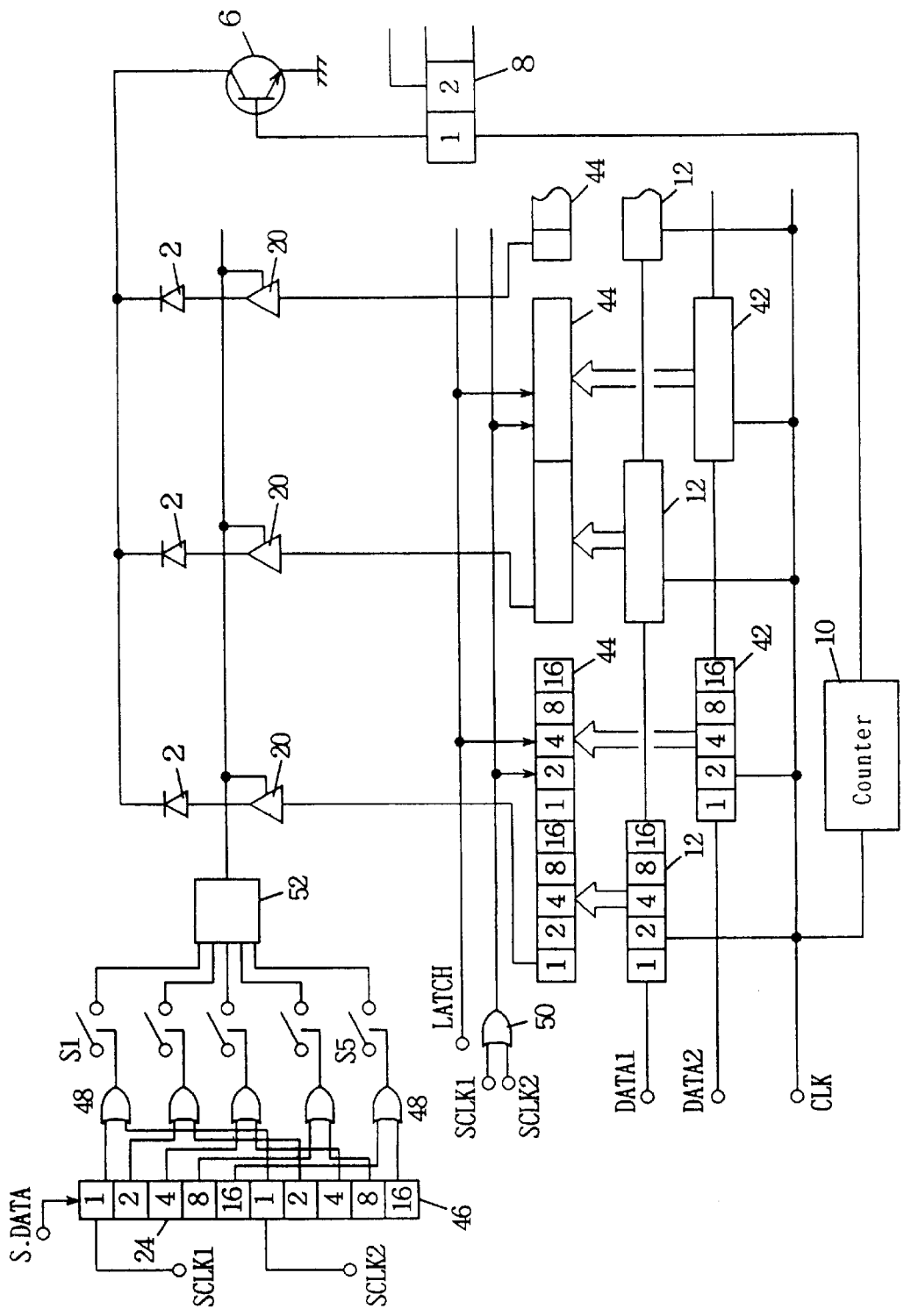
FIG. 7 is a circuit diagram in part of the LED head according to a second embodiment.
Figure 8:
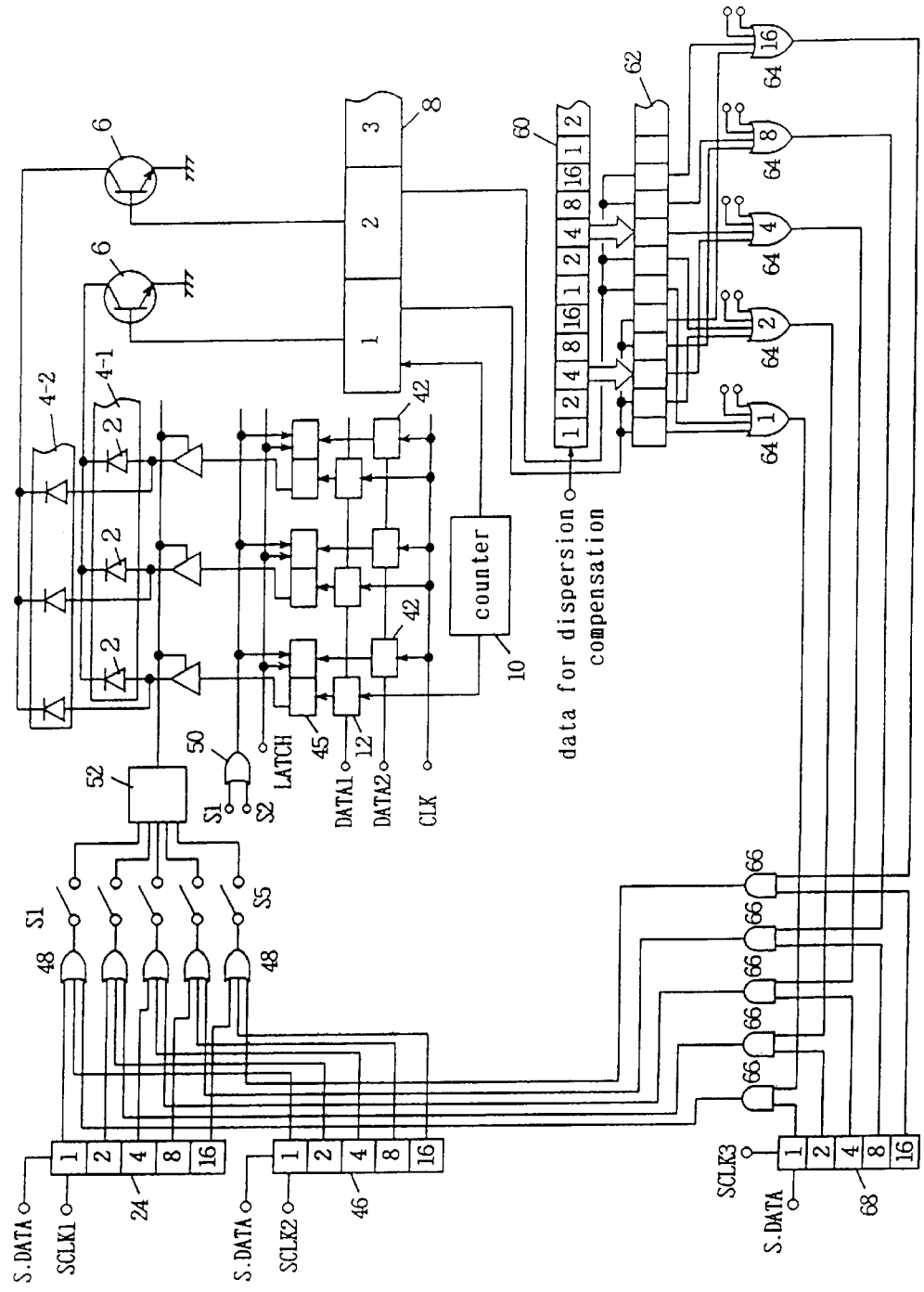
FIG. 8 is a circuit diagram in pat of a version to the second embodiment.
Figure 9:
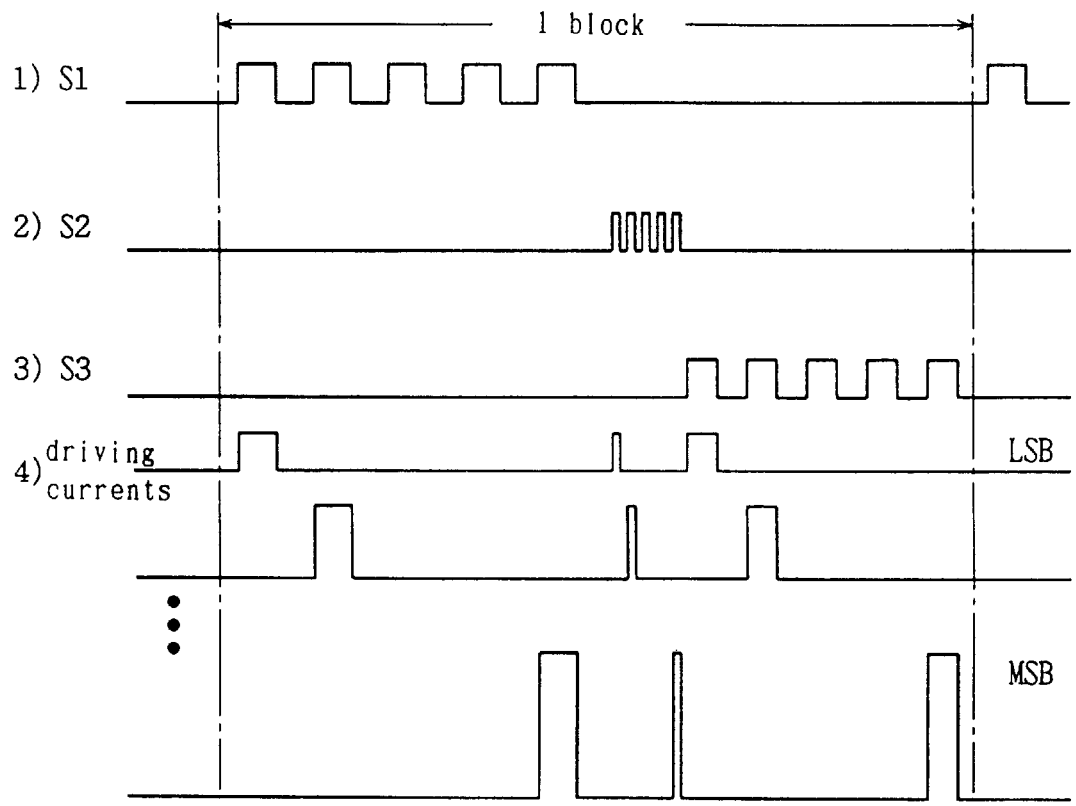
FIG. 9 is a wave form diagram of the LED head shown in FIG. 8.

FIGS. 7–9 show a second embodiment and its version. In FIG. 7, indicated by 42 are shift registers storing the dispersion compensation data for each light emitting body 2, and indicated by 44 are latch circuits of parallel input and of serial output, storing the data of the shift registers 12 and the shift registers 42. The latch circuits 44 may be, for example, shift registers. Indicated by 46 is a shift register for scanning the standard resistances R1–R5 for compensating a dispersion between light emitting bodies 2 in a block. Indicated by 48 are five OR-gates, and 52 is a new reference current generator which consists of the reference current generator 26 and the standard resistances R1–R5.

FIG. 8 shows a version of the LED head shown in FIG. 7 for compensating a dispersion between blocks also. In FIG. 8, 60 is a shift register storing the inter-block dispersion compensation data of, for example, 5 bits 32 gray levels in BCD code system. 62 is AND-gates, and 64 is OR-gates. Further, 66 is AND-gates, and 68 is a shift-register. The inter-block dispersion compensation data in the shift register 60 is stored once at the beginning of the operation of the LFD head, since it is constant. 45 is presetable shift resisters, each having one more bit than the sum of the shift registers 12 and 42. When inter-block compensation is done with usage of the data stored in the shift register 60, the final bit, presetted at one, in the shift register 45 is used for performing the printing.

The operational waveforms in the version shown in FIG. 8 are shown in FIG. 9. Shift-clock S1 is a clock for controlling each light emitting body 2 into 32 gray levels of 5 bits from LSB to MSB according to printing data. Shift clock S2 is a clock which compensates dispersion between light emitting bodies 2 into 5 bits 32 gray levels. Shift clock S3 is a clock for compensating the dispersion between the blocks 4 into 5 bits 32 gray levels. The printing data generator 30 generates the shift clocks S1, S2 and S3, for example, in this order. The left side in FIG. 9 corresponds, for example, to LSB, and the right side corresponds, for example, to MSB. The gray scale printing data, the inner-block dispersion compensation data, and the inter-block dispersion compensation data may be dealt with in any order, and the data may be fetched from the LSB or from the MSB.

The data bit in the shift register 24 shifts from LSB to MSB in synchronization with the shift clock SCLK1, correspondingly, the switches S1–S5 are scanned, and driving current changes from 1 mA to 16 mA. The data bit int the shift register 46 similarly shifts with the shift clock SCLK2, and the driving current changes from 1 mA to 16 mA. A part of the data in the shift register 60 corresponding to a block presently being driven is retrieved through the AND-gates 62 by the cathode drive IC 8 and is sliced into each bit with the OR-gates 64. These data is processed by the AND-gates 66 according to the data bit position in the shift register 68, is sent by one bit in series to the switches S1–S5, and makes the reference current generator 52 scanned from LSB to MSB.

The reference current generator 52 is scanned for three times, as shown in FIG. 9: first with shift clock SCLK1; then with shift clock S2; and finally with shift clock S3. As a result, each light emitting body 2 are operated three times, dispersion between blocks and between light emitting bodies are compensated during the first two scans, and then gray scale printing is done.

EMBODIMENT 3

Figure 10:
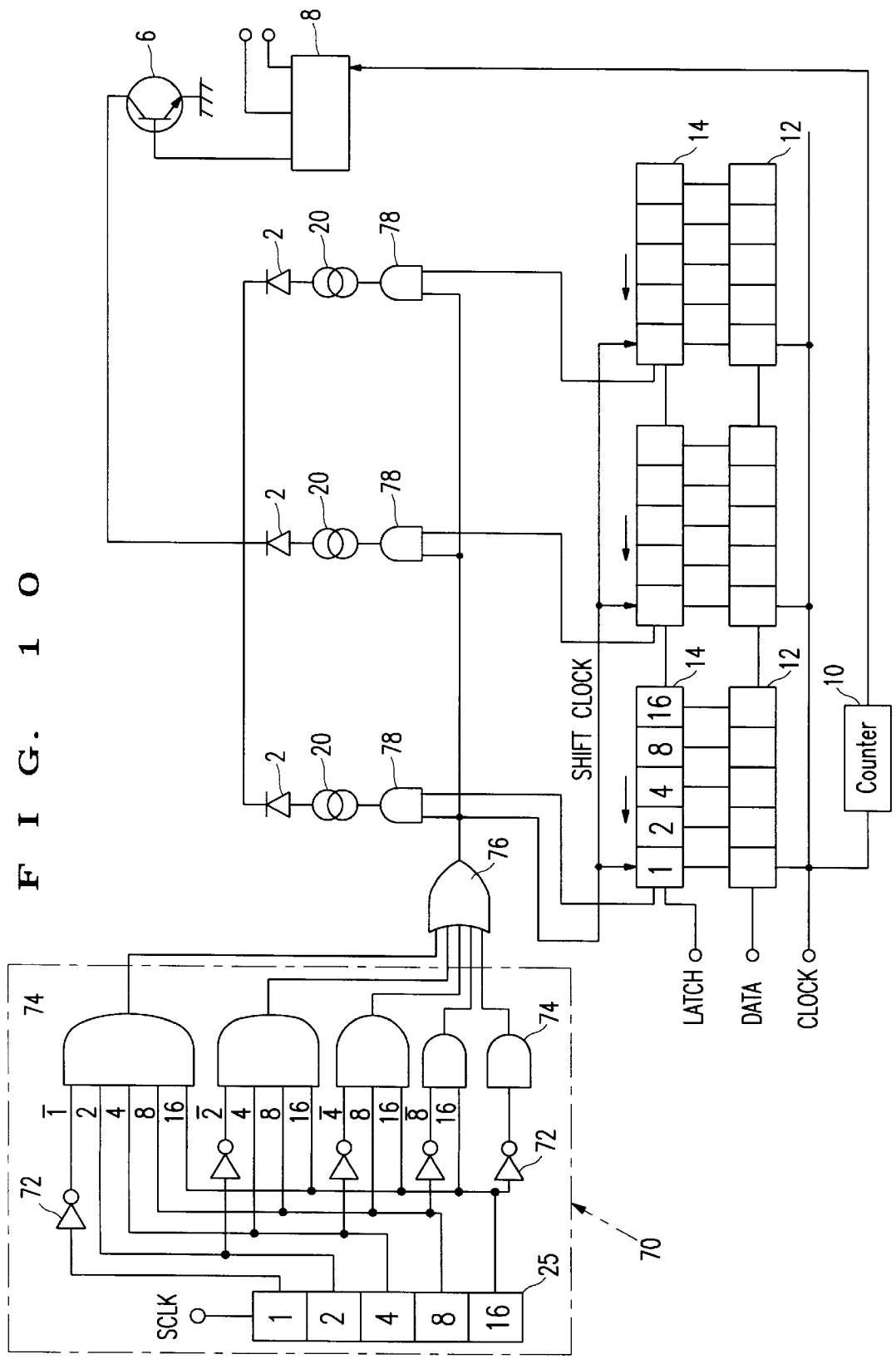
FIG. 10 shows the circuit of the LED head in part according to a third embodiment.
Figure 11:
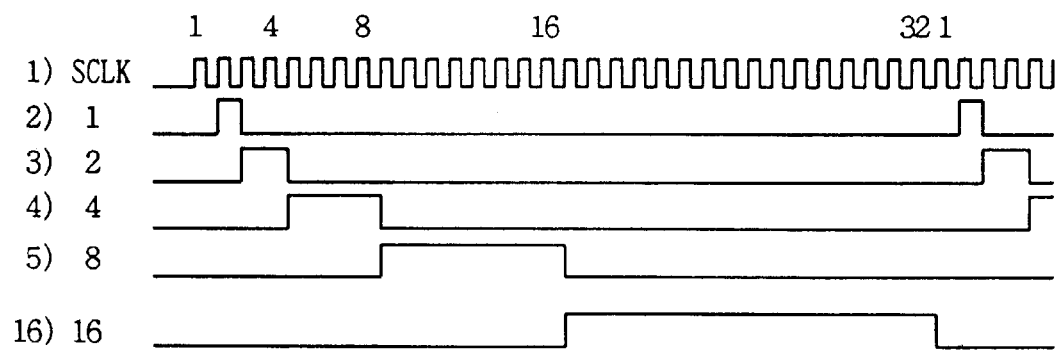
FIG. 11 is a wave form diagram of the LED head shown in FIG. 10.
Figure 12:
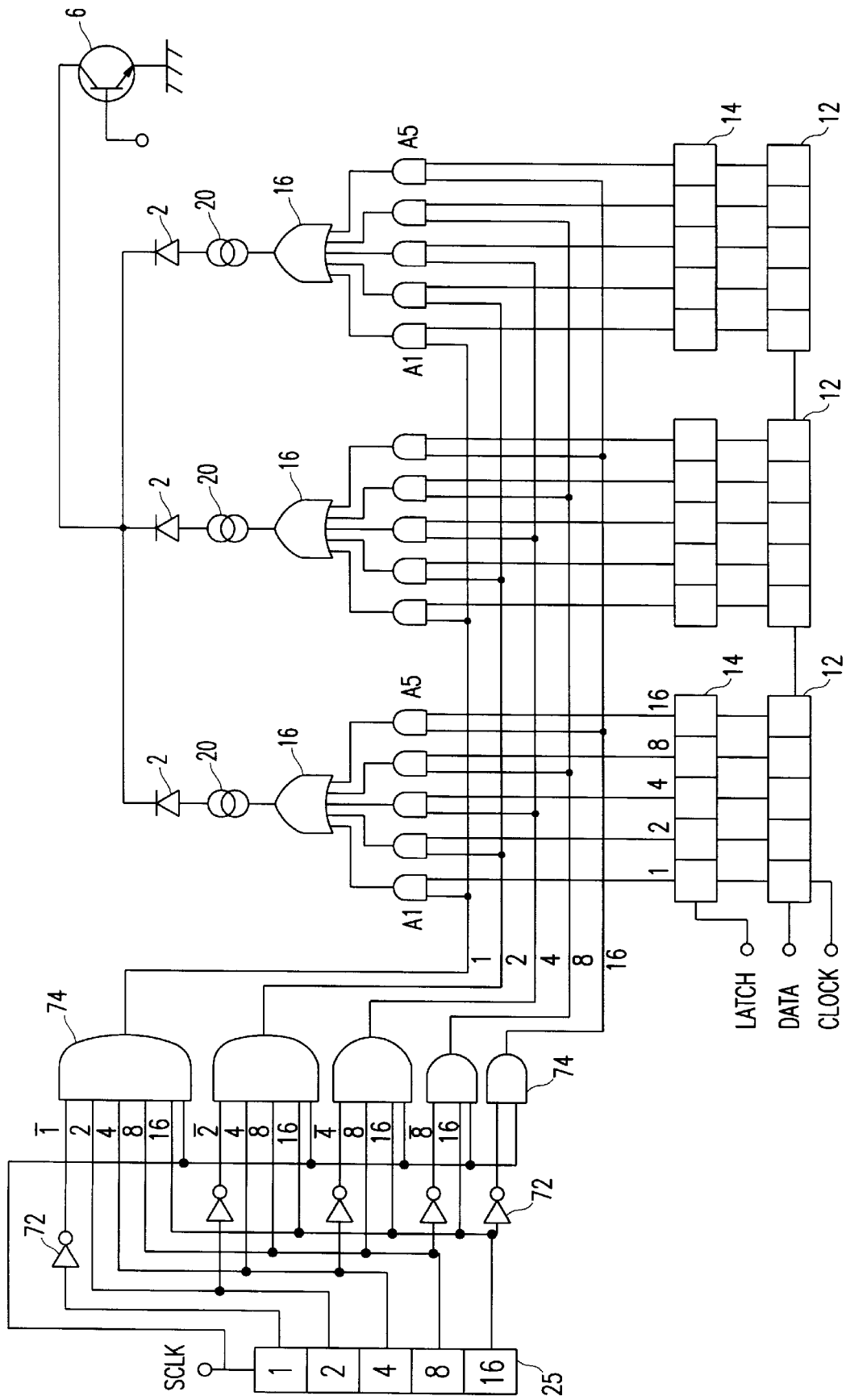
FIG. 12 is a circuit diagram of aversion in part to the third embodiment.

FIGS. 10–12 show an embodiment using pulse width control for the dispersion compensation and gray scale printing. In the present embodiment, the printing data is encoded into BCD code system and then fetched by respective bits with slicing. According to the embodiment, the light emitting current for each bit is constant, but the light emitting period of each bit is changed. In FIG. 10, 25 is a shift register of DFF type, of which output pulse width changes into two times by each bit. 70 is a BCD counter, 72 is invertor, and 74 is AND-gates. The BCD counter 70 has five kinds of output pulses, and their pulse width changes in the ratio of 1:2:4:8:16 for the printing of 32 gray scale levels by combining them. Being different from usual counters, the counter 70 has only one kind of output pulse at a time and causes the output only from one AND-gate 74. When the BCD data is, for example, (1,1,1,1,1), the AND-gate 74 in the bottom position is opened. 76 is an OR-gate and 78 is AND-gates. The printing data of the printing data generator 30 shown in FIG. 1 is inputted into the shift-register 12, and the data contains gray scale printing, dispersion compensation for each light emitting body 2, and dispersion compensation between blocks.

The counter 70 works by every 32 shift-clock pulses, as shown in FIG. 11, and the five AND-gates 74 generate five kinds of pulses of which width changes as 1:2:4:8:16. On the other hand, the shift register 12 stores five kinds of data of 1:2:4:8:16 in weight, they are parallelly transferred to the latch circuits 14, then are left shifted by one bit by means of the OR-gate 76 in synchronization with the output change in the counter 70. Data bits at LSB positions are sent to the AND-gates 78, and the light emitting bodies 2 are driven according to the outputs of the gates. Thus, according to the present embodiment, the shift register 12 stores the printing data in the BCD code system, pulses the width of which is proportional to the weight of each bit are generated by the counter 70, the corresponding bit of the data is fetched from the latch circuits 14, and each light emitting body 2 emits light for a period proportional to each pulse width.

FIG. 12 shows a version of the embodiment shown in FIG. 10. In place of the left shift of the data in the latch circuit 14, the data is sliced and fetched by one bit by means of the AND-gates A1–A5 and the OR-gates 16.

EMBODIMENT 4

Figure 13:
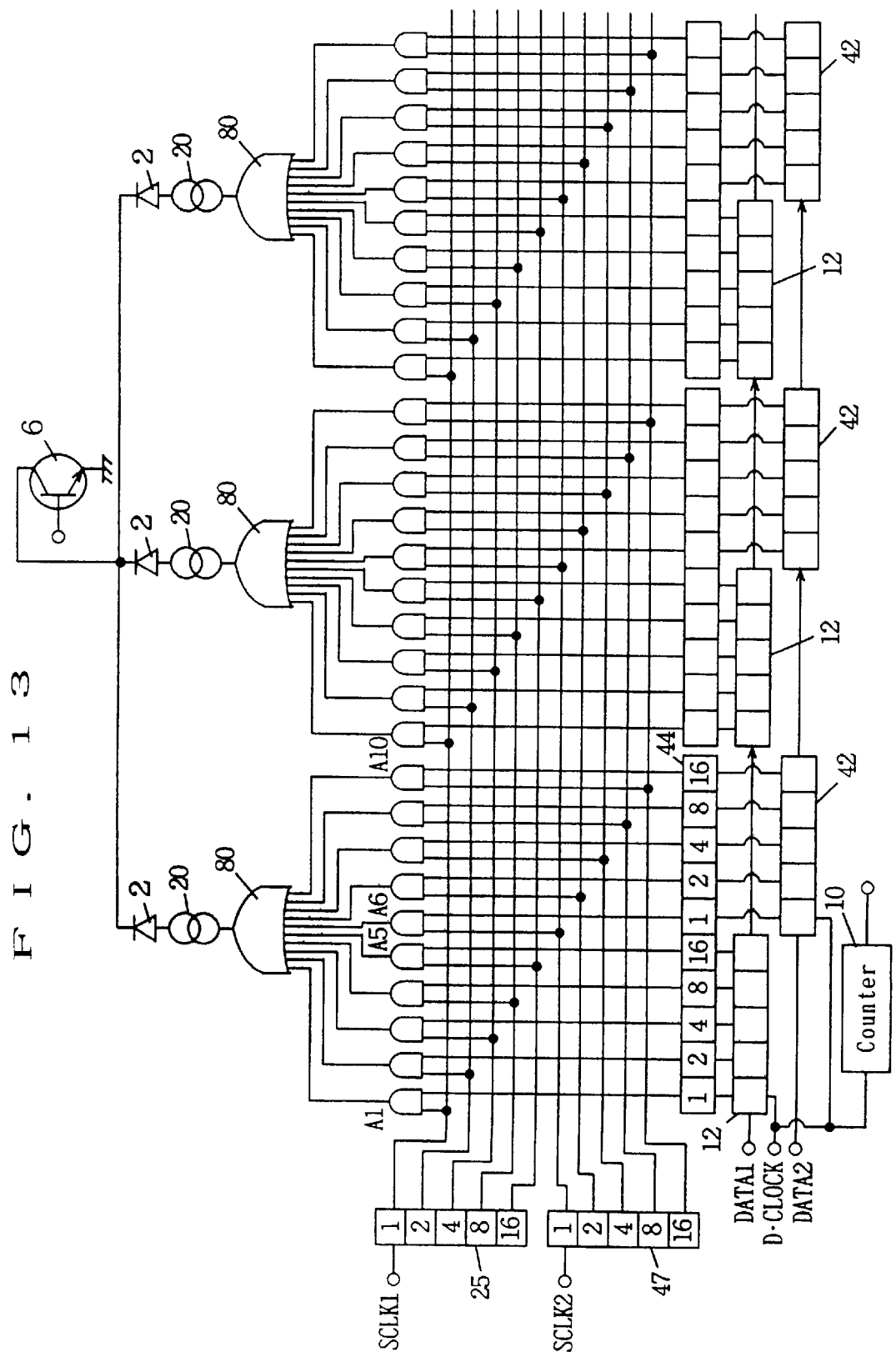
FIG. 13 is a circuit diagram of the LED head according to a fourth embodiment in part.
Figure 14:
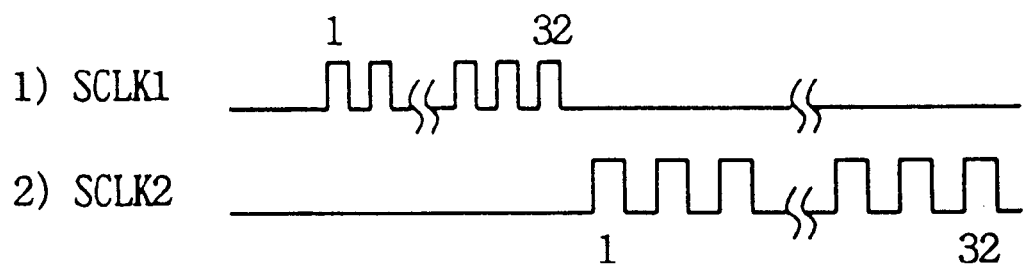
FIG. 14 is a wave form diagram of the LED head shown in FIG. 13.

FIG. 13 and FIG. 14 show a fourth embodiment. The embodiment shows an improvement over the version shown in FIG. 12 and deals with gray scale printing data and dispersion compensation data for each light emitting body 2. Indicated by 47 is a shift register of DFF type, A6–A10 are new AND-gates, and 80 is new OR-gates. According to the embodiment, the shift register 12 stores gray scale printing data, the shift register 42 stores the dispersion compensation data between light emitting bodies 2, and these data are stored as 10 bit serial data in the latch circuit 44. By means of the output of the shift register 25 and the AND-gates A1–A5, gray scale printing data is fetched by one bit, and similarly, the dispersion compensation data is fetched by one bit, by means of the shift register 47 and the AND-gates A6–A10. These output, as pulses, are combined by the OR-gates 80, and the light emitting bodies 2 are driven during the time proportional to the width of the combined output pulses.

The operation of the embodiment shown in FIG. 13 is shown in FIG. 14. 32 pulses of the shift clock SCLK1 are inputted for gray scale printing, 32 pulses of the shift clock SCLK2 are inputted for dispersion compensation, the printing data in the latch circuit 44 is read by one bit with these pulses. The output pulses of shift registers 25 and 47 increase by the twice in width, since they are of DFF type, and thus light emitting bodies 2 are driven.

EMBODIMENT 5

Figure 15:
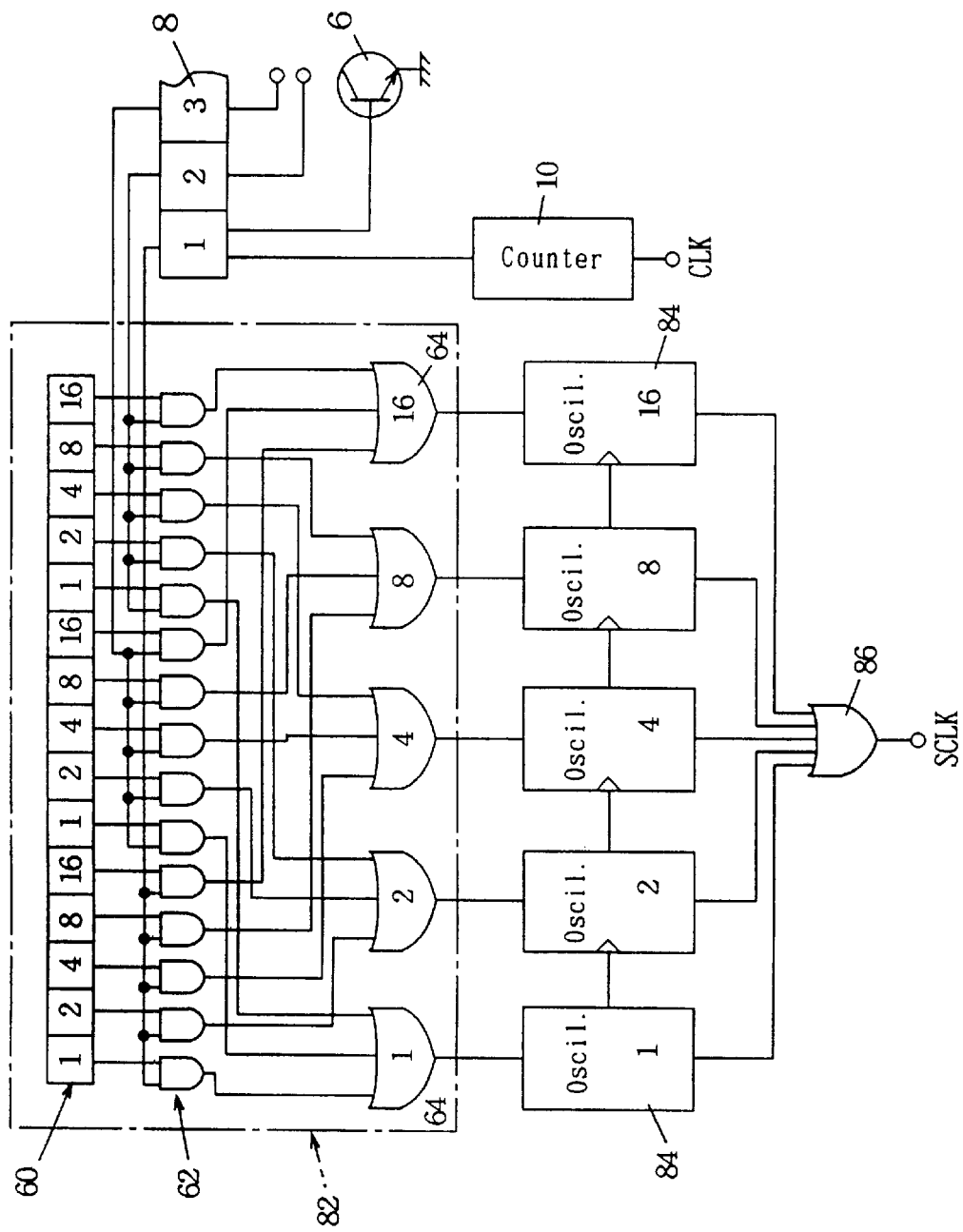
FIG. 15 is a circuit diagram of the LED head according to a fifth embodiment in part.
Figure 16:
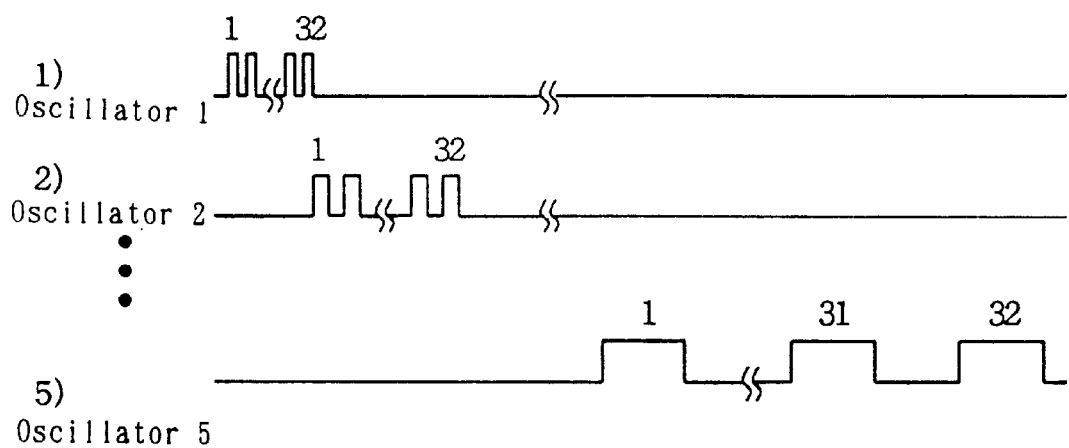
FIG. 16 is a wave form diagram of the LED head shown in FIG. 15.

FIG. 15 and FIG. 16 show a fifth embodiment. In the embodiment, an inter-block dispersion compensator 82 is added to the embodiment shown in FIG. 12 so that gray scale printing and the block dispersion compensation are performed. The inter-block dispersion compensator 82 is similar to the one shown in FIG. 9, and indicated by 84 is five oscillators, each of which outputs 32 pulses. Their pulse width changes in the ratio of 1:2:4:8:16 from the left to the right in the figure. 86 is a new OR-gate. The output pulse of the OR-gate 86 is inputted as shift clock SCLK to the shift register 25 in FIG. 12, and the shift register 25 is driven five times for a block, since the five oscillators 84 are provided. As a result, the LED head is operated as shown in FIG. 16, each oscillator 84 outputs 32 pulses in the order from the left to the right, their pulse width changes as 1:2:4:8:16, and the total output time of the OR-gate 86 changes according to 32 gray levels at every block 4.

EMBODIMENT 6

Figure 17:
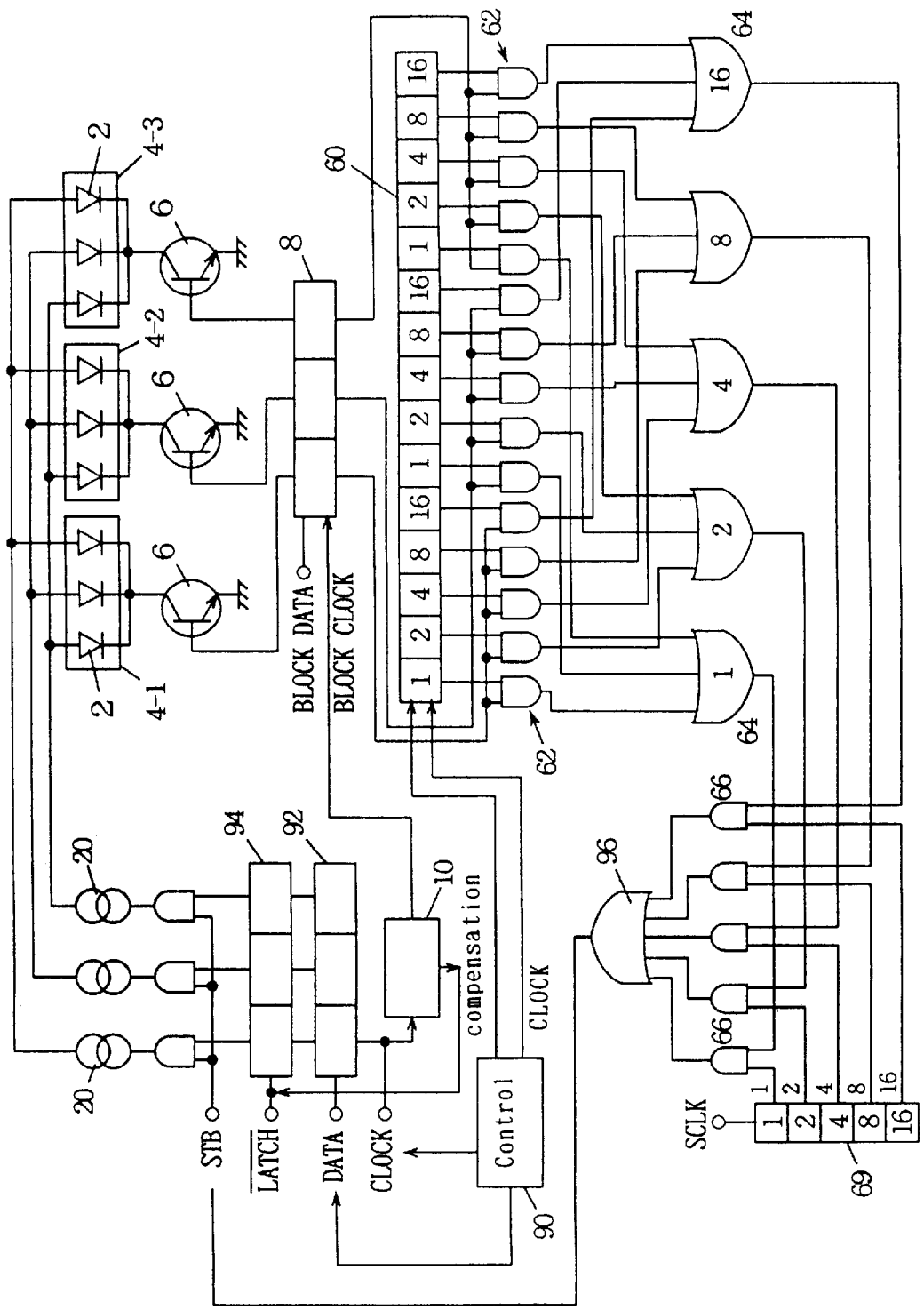
FIG. 17 is a circuit diagram of the LED head according to a sixth embodiment in part.
Figure 18:
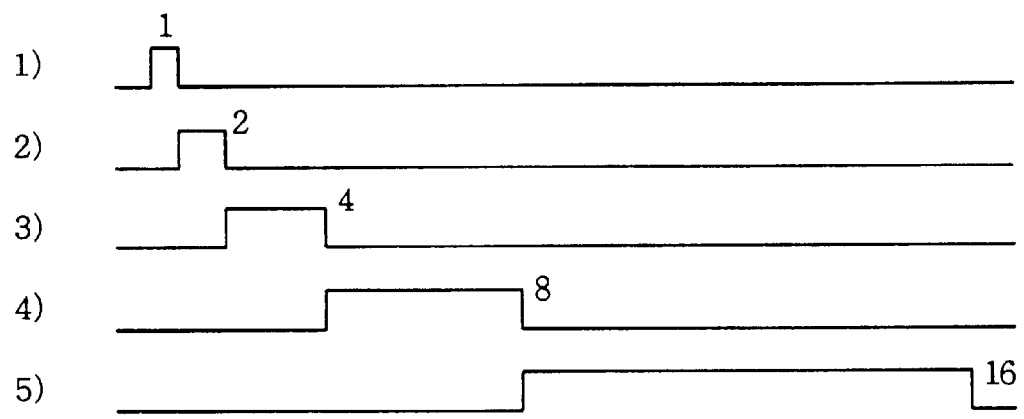
FIG. 18 is a wave form diagram of the LED head shown in FIG. 17.

FIG. 17 and FIG. 18 show a sixth embodiment. The present embodiment performs only the compensation between blocks, the OR-gates 64 read the inter-block dispersion compensation data sliced into five bits at each block 4, and the data in DFF shift register 69 is shifted by one bit with shift clock SCLK. The AND-gates 66 perform AND-operation, and the outputs are used as a strobe signal through OR-gate 96. Other features are similar to conventional LED heads which do not perform gray scale printing. According to the embodiment, when the LED head begins to operate, the compensation data is inputted from a control circuit 90 to the shift register 60 with a clock signal. After setting the compensation data, printing data, a clock signal and a latch signal is inputted from the control circuit 90. The printing data of one bit for each dot 2 is stored in a shift register 92. The latch signal inputs the stored data to the latch circuit 94, and the strobe signal drives the mirror constant current supplies 20. In the embodiment of FIG. 17, the outputs of the shift register 69 are the five kinds of 1)–5) shown in FIG. 18, and the data in the shift register 60 is read in the order from LSB to MSB in synchronization with the outputs. They are combined so as to make the strobe signal STB for driving the light emitting bodies 2.

EMBODIMENT 7

Figure 19:
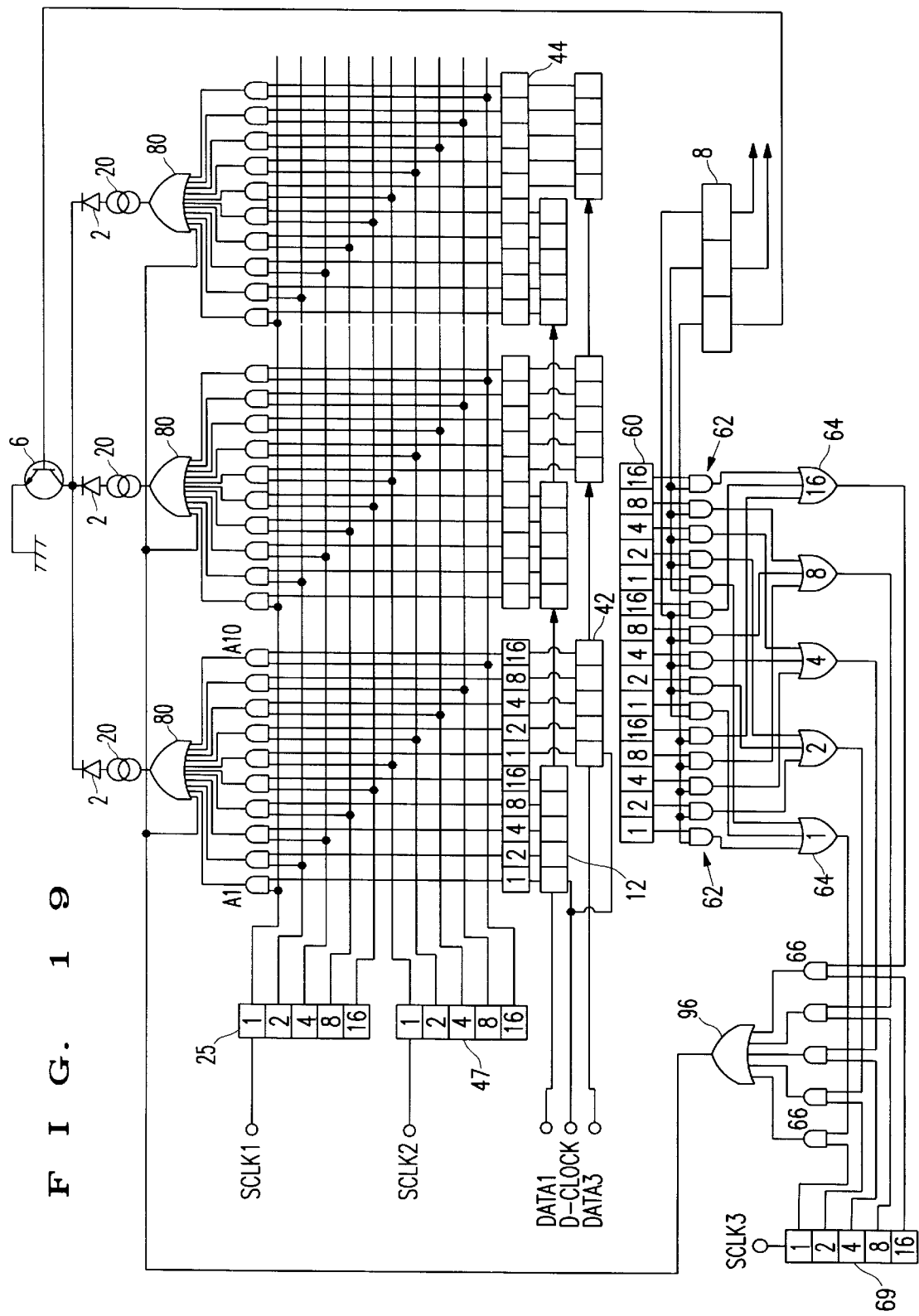
FIG. 19 is a circuit diagram of the LED head according to a seventh embodiment in part.
Figure 20:
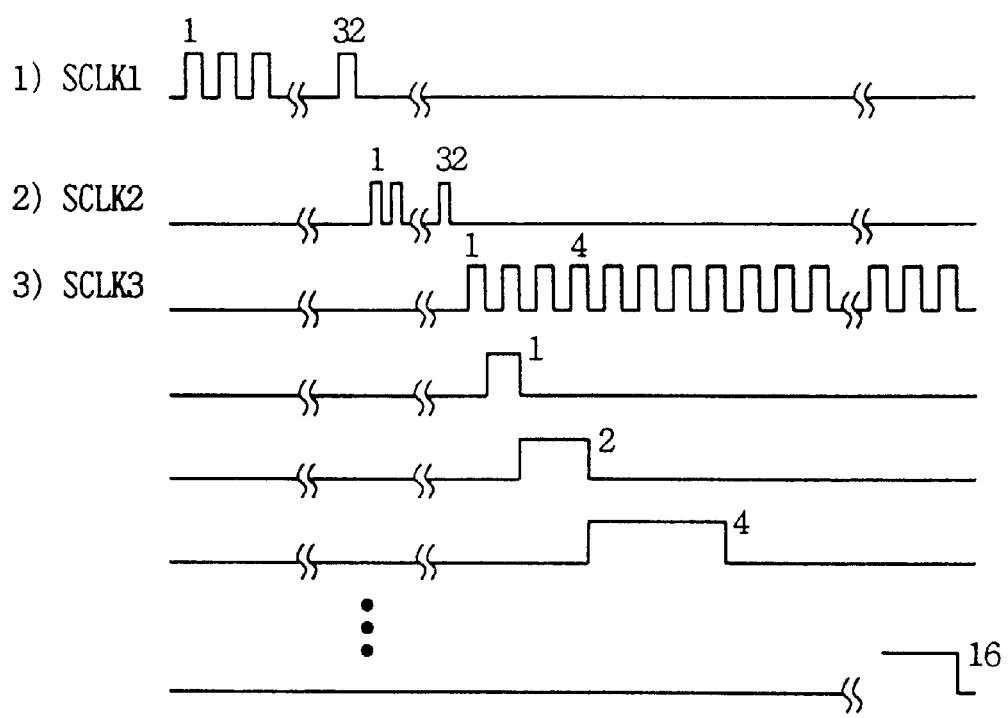
FIG. 20 is a wave form diagram of the LED head shown in FIG. 19 .

FIG. 19 and FIG. 20 show a seventh embodiment. In the embodiment shown in FIG. 19, the shift register 12 stores the gray scale printing data of each light emitting body 2, the shift register 42 stores the inner-block dispersion compensation data, and the shift register 60 stores the inter-block dispersion compensation data. These data are all stored in BCD code and have five bits for 32 gray levels. By means of the AND-gates A1–A5 and the data in the shift register 25, the data in the shift register 12 is read by every bit from LSB to MSB. The data in the shift register 42 is similarly read by one bit by means of the shift register 47 and the AND-gates A6–A10. Further, the data in the shift register 60 is read by one bit in series by means of the shift register 69 and AND-gates 66, and the light emitting bodies 2 are driven in synchronization with them.

The over-all waveforms in the operation of the embodiment is shown in FIG. 20, and the data in the shift register 12 controls the light emitting bodies 2 with use of the shift clock SCLK1. The data in the shift register 42 is read with the shift clock SCLK2 and the data in the shift register 60 is read with the shift clock SCLK3.

EMBODIMENT 8

Figure 21:
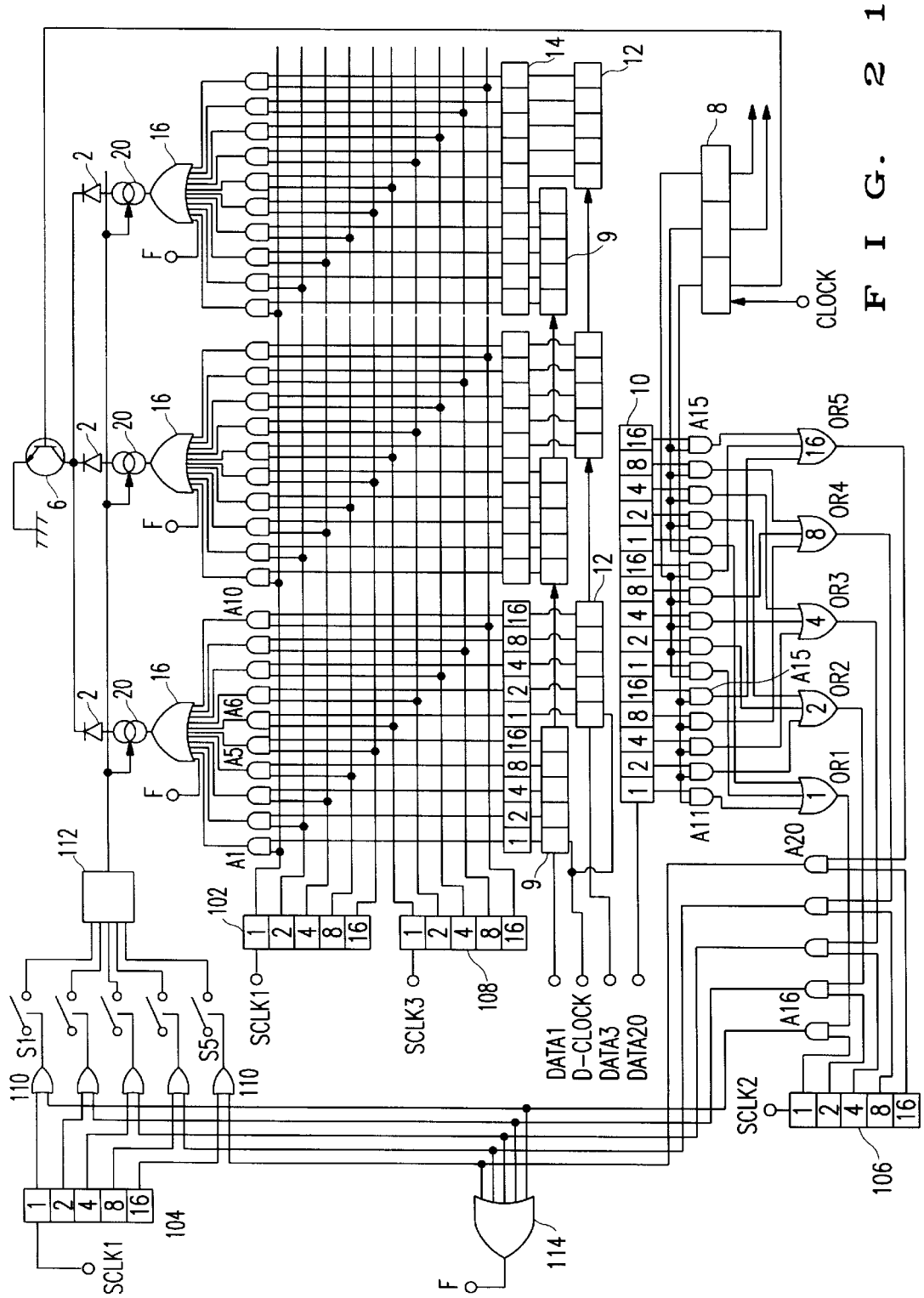
FIG. 21 is a circuit diagram of the LED head according to a eighth embodiment in part.

FIGS. 21–24 show an eighth embodiment and its versions. In FIG. 21, 2 is individual light emitting body; for example, 64–128 light emitting bodies constitute an LED array called a block, and, for instance, 40 blocks are provided. The dispersion compensation for them is necessary for the gray scale control, since output dispersion between blocks is remarkable and dispersion between light emitting bodies 2 in a block is also remarkable. Both static and dynamic drive are acceptable, sine the inter-block dispersion and the inner-block dispersion are independently dealt with, and dynamic drive is more suitable. 6 is the cathode drive transistors, and 8 is the cathode drive IC for turning one of the plural cathode drive transistors 6 on in series. The cathode drive IC 8 counts a clock CLOCK from a printer main body and detects a change in a block to be operated from the count number of the clock for controlling the transistors 6.

Indicated by 9 is a shift register, a first memory, which stores dispersion compensation data DATA1 for each light emitting body 2 of 5 bits 32 gray levels in BCD code system. Indicated by 10 is a shift register, a second memory, for storing interblock dispersion compensation data DATA2 of 5 bits 32 gray levels. The inter-block dispersion compensation data is constant, and therefore, it may be stored in a non-volatile memory such as an EPROM in place of the shift register 10. Indicated by 12 is a third memory which comprises a shift register for storing gray scale printing data DATA3 for each light emitting body 2 in BCD code system, which has, for example, 32 levels. Denoted by 14 is a latch circuit which receives and stores the data in the shift registers 9 and 12. A1–A10 are AND-gates for each light emitting body 2, 16 are OR-gates, and 20 are mirror constant current supplies for respective light emitting bodies 2.

Denoted by 102, 104, 106, 108 are shift registers, for example, and each of them stores 5 bit data. The shift registers 102, 104 are driven by a strobe signal SCLK1, the output data shifts sequentially by one bit with this signal, and the duration period of the outputs are common. The shift register 106 is driven by a strobe signal SCLK2, the data bit shifts by one bit with this signal, and the duration period of the output is common. The shift register 108 comprises a divider which has DFFs and gates. The register 108 is different from usual dividers in that when a bit in the register 108 has a data of 1, then the less significant bits are not outputted. Let the MSB be in the left end, when the internal output of the register 108 is, for example, (0, 1, 1, 1, 1), the external output is (0, 1, 0, 0, 0), since the second left bit prohibits the less significant bits from being outputted. The shift register 108 is driven by a strobe signal SCLK3, when the output period for the LSB is, for example, one, the output period for each bit is 1:2:4:8:16 which changes into five steps and corresponds to the weight of each bit. The shift register 108 is used as a pulse generating circuit.

S1–S5 are switches, 110 is OR-gates, and 112 is a standard current generator. The switches S1–S5 change the selection of standard resistances built in the standard current generator so that standard current changes into 5 levels of, for example, 1 mA, 2 mA, 4 mA, 8 mA, and 16 mA. The value of the standard current corresponds to the weight of each bit stored in the shift register 9 and 10 in BCD code system. The mirror constant current supplies 20 apply light emitting current, which is equal to the standard current in size, to each light emitting body 2 and the OR-gates 16 make the current turn on and off.

Indicated by A11–A15 are AND-gates, connected to the shift register 10, and there are five AND-gates A11–A15 for each block. The AND-gates A11–A15 are operated with a signal from the drive IC 8 at every block and fetch the block dispersion compensation data corresponding to one under the current drive from the shift register 10. OR1–OR5 are OR-gates, OR-gate OR1 combines the least significant bits of respective blocks, similarly, OR-gate OR2 combines the second least significant bits, and so on. Denoted by A16–A20 are AND-gates which synchronize the signals of OR-gates OR1–OR5 with the signal from the shift register 106 by AND-operation. 114 is an OR-gate whose output is the OR-value of the outputs of the AND-gates A16–A20, and with this output, the OR-gates 16 are turned on for the period for inter-block dispersion compensation.

Figure 22:
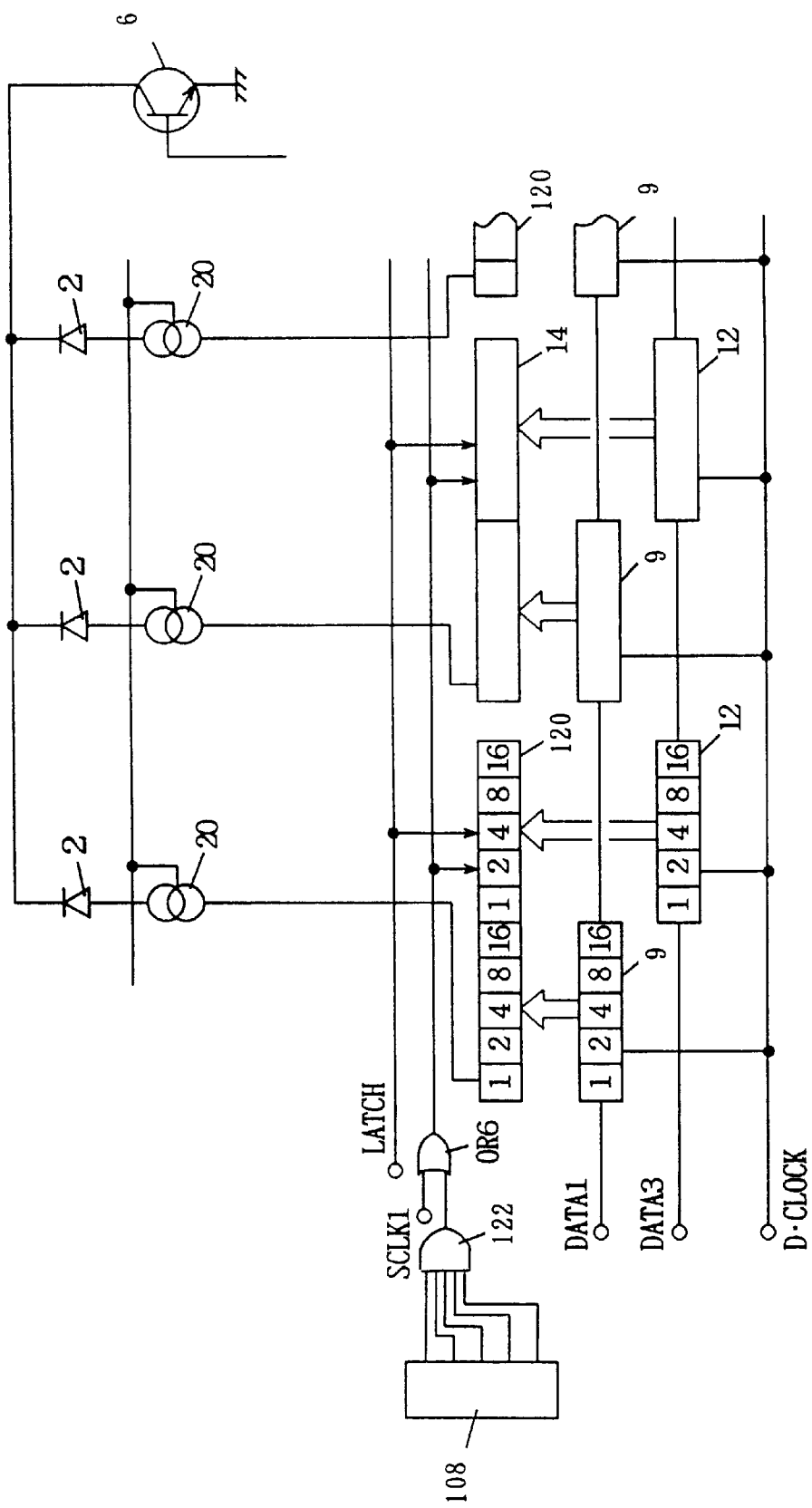
FIG. 22 is a circuit diagram of a version to the eighth embodiment in part.

The LED head shown in FIG. 21 may be changed into one shown in FIG. 22, which shows only the part changed. Denoted by 120 is a shift register of the parallel input and of serial output. OR 6 is an OR-gate, and 122 is an AND-gate. The data in the shift register 120 is left shifted with the shift clock SCLK1 and the output of the shift register 108 and is read from the LSB. Thus, the inner-block dispersion compensation data in the shift register 9 and the gray scale printing data in the shift register 12 are fetched by one bit by means of the shift register 12. And therefore, the AND-gates A1–10 are not required.

Similarly, when the shift 10 is one whose data is circularly shifted left by one bit with a shift clock SCLK2, and when only a least significant bit is fetched, then the AND-gates A11–A15 and the OR-gates OR1–OR5 are unnecessary. In this instance, to the AND-gates A16–A20 are inputted, for example, the least significant bit of the shift register 10. And the signal of the shift register 106 is used for controlling the signals inputted into the AND-gates A16–A20 so that the data in the shift register 10 is sliced into each bit.

Figure 23:
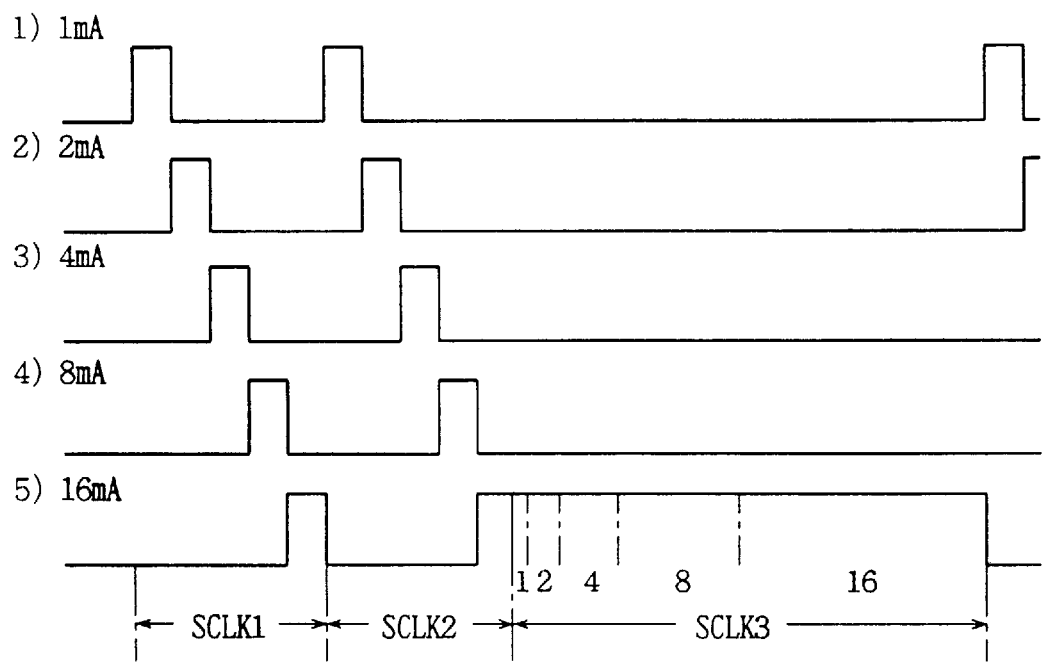
FIG. 23 is a wave form diagram of the eighth embodiment.

FIG. 23 shows the operation of the present embodiment. The dispersion compensation data for each light emitting body 2 is in the shift register 9, and the gray scale printing data is in the shift register 12. Moreover, the compensation data for the inter-block dispersion is in the shift register 10. These data are commonly in BCD code system. The data for one block is inputted to the shift registers 9 and 12 and are transferred to the latch circuit 14 with an un-shown latch signal.

FIG. 23 shows operational waveforms for one block. First, five of shift clocks SCLK1 are sent to the shift registers 102 and 104. The first one clock turns the AND-gate A1 and the switch S1 on, and the reference current generator 112 outputs a standard current of 1 mA corresponding to the LSB for the inner-block dispersion compensation data. The individual mirror constant current supplies 20 turn on or off by means of the OR-gates 16 according to the LSB data of the inner-block dispersion compensation data, and the light emitting current is 1 mA if on. The standard current is increased to 2 mA with the following clock, and the mirror constant current supplies 20 are made turned on or off according to the second least significant bit of the inner-block dispersion compensation data, so that the light emitting current is 2 mA if on. Similarly, the standard current is sequentially changed into 4 mA, 8 mA, and 16 mA, and the OR-gates 16 are turned on or off according to each bit in the inner-block dispersion compensation data. Thus, the standard current from the reference current generator 112 is changed with the shift register 104 and the switch S1–S5, and in synchronization with this by means of the AND-gates A1–A5 and the shift register 102, the inner-block dispersion compensation data is fetched by one bit so that the OR-gates 16 are made on or off.

Then, the shift clock SCLK2 is sent to the shift register 106 by five clocks for compensating the inter-block dispersion. The block dispersion compensation data for the block under the current drive is fetched by the AND-gates A11–A15, and they are taken out through the OR-gates OR1–OR5. The data is inputted to the switches S1–S5 through the AND-gates A16–A20 in synchronization with the output of the shift register 106. Thus, the data in the shift register 110 is fetched by one bit with the shift register 106 and the AND-gates A16–A20, etc. Thus, the standard current changes according to this. An OR-gate 114 outputs the OR output F of the outputs of AND-gates A16–A20, and the output F turns the OR-gates 16 on, so that the mirror constant current supplies 20 are operated according to the standard current determined by reference current generator 112.

After the compensations for inner-block and inter-block dispersions, the gray scale printing is performed. For this end, the shift clock SCLK3 is sent by five clocks, and the width of the output pulses of the shift register 108 is changed into 1:2:4:8: and 16. These pulses drive the AND-gates A6–A10 so that the OR-gates 16 are turned on for the period corresponding to the gray scale printing data in the shift register 12. The light emitting current for the gray scale printing is constant, for example, is 16 mA, while it may be arbitrary between 1–16 mA.

Figure 24:
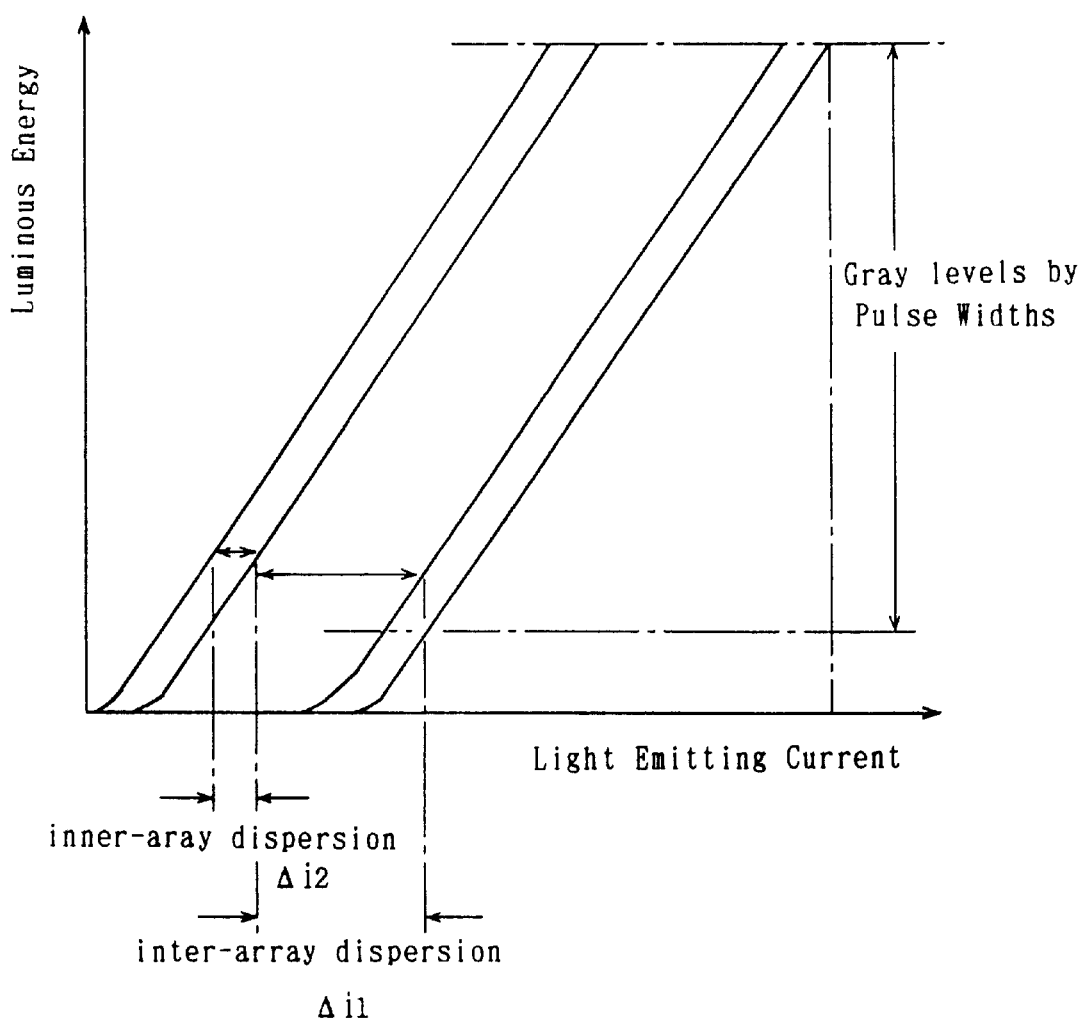
FIG. 24 is a characteristic diagram showing the principle of gray scale printing and inter-block and inner-block dispersion compensations.

FIG. 24 shows the principle of the dispersion compensation and gray scale printing in the present embodiment. The inner-block dispersion between light emitting bodies 2 to the average luminescence output of the block is, for example, within ± about 30% in LED heads, and the inter-block dispersion is further larger; for example, is within ± 100%. Therefore, for compensating the inter-block dispersion, the light emitting current is changed by $\Delta$ i1, and for compensating the inner-block dispersion the light emitting current is changed by $\Delta$ i2. Therefore, the dispersions are compensated. For these ends, the standard current of the reference current generator 112 is changed from 1 mA to 16 mA, and in synchronization with this, the dispersion compensation data is taken out by one bit so that the mirror constant current supplies 20 are made on or off according to the dispersion compensation data. The gray scale control is done by means of pulse width control using the shift register 108, and the light emitting current is constant during the gray scale printing.

The following is the advantages of the present embodiment. Since the dispersion compensation and the gray scale printing are independently dealt with, high speed printing is performed with a simple circuit because of the simple data processing. The dispersion compensation is divided into the inner-block dispersion and the inter-block dispersion, and since the dispersion compensation data for the inter-block dispersion is constant, the data transfer and the data processing are made easy. Since the reference current generator 112 and the mirror constant current supplies 20 control the light emitting current, the light emitting current is easily changed with change in the standard current. The gray scale printing is performed by pulse width control, and the dispersion compensation is separately executed. Moreover, the data is simply fetched with the AND-gates A1–A20 etc. and therefore, it is not necessary to provide counters for respective bits.

What is claimed is:

1. A print head having plural blocks each having plural light emitting bodies comprising:

a first memory for storing printing data for each light emitting body or dispersion compensation data between blocks in a BCD code system;

first fetching means for fetching said data using bit slicing from said first memory;

at least one current source for supplying a light emitting current to each light emitting body, wherein said light emitting current is scannable and the size of the current is changed sequentially during a scan according to the significance of each bit in the BCD code system; and scanning means for scanning said current source in synchronization with the fetching of data with bit slicing by said first fetching means.

2. The print head of claim 1, wherein said current source comprises: a reference current generator; a plurality of resistors having predetermined resistance for changing an output current of the reference current generator; and a plurality of mirror current supplies for supplying light emitting currents to respective light emitting bodies according to the output current of the reference current generator.

3. The print head of claim 1, wherein said first memory stores both gray scale printing date for each light emitting body and dispersion compensation data for each light emitting body in each block, and said first fetching means is configured to sequentially fetch said gray scale printing data and said dispersion compensation data, and said scanning means sequentially scans said current source in synchronization with the fetching of said gray scale printing data and said dispersion compensation data.

4. The print head of claim 3 further comprising:

a second memory for storing dispersion compensation data between blocks in a BCD code system and second fetching means for fetching said dispersion compensation data between blocks using bit slicing from the second memory, wherein said scanning means scans said current source sequentially in synchronization with the fetching of said gray scale printing data, said dispersion compensation data for each light emitting body in each block, and said dispersion compensation data between blocks.

5. A print head having plural blocks each having plural light emitting bodies comprising:

a first memory for storing dispersion compensation data between light emitting bodies in a block;

a second memory for storing dispersion compensation data between blocks;

a third memory for storing gray scale printing data for each light emitting body;

fetching means for fetching respective data stored in the first, second and third memories;

at least one variable current supply for supplying a light emitting current to each light emitting body;

current control means for changing said light emitting current by controlling said variable current supply according to the fetched data from said first memory and said second memory; and light emitting time control means for controlling periods of said light emitting current of said variable current supply according to the fetched data from said third memory.

6. The print head of claim 5, wherein the first second and third memories store the respective data in a BCD code system, wherein said fetching means is configured to fetch respective data using bit slicing from the first, second and third memories sequentially, wherein the current control means controls said variable current supply to change the size of the light emitting current according to the significance of each bit in said BCD code system, wherein said light emitting time control means comprises at least one pulse generating circuit for generating pulses which change in width according to the significance of each bit of the data fetched from the third memory, and wherein the size of the current supplied by said variable current supply is substantially constant during each pulse.

7. A print head having plural blocks each having plural light emitting bodies comprising:

a first memory for storing printing data or dispersion compensation data in a BCD code system;

a first fetching circuit for fetching data from the first memory using bit slicing;

at least one current source for supplying a light emitting current to each light emitting body, wherein the light emitting current supplied to each light emitting body is scannable and the size of the current is changed sequentially during a scan according to the significance of each bit in the BCD code system; and a scanning circuit for scanning the current source in synchronization with the fetching of data with bit slicing by the first fetching circuit.

8. The print head of claim 7, wherein the scanning circuit comprises a shift register operated in synchronization with the first fetching circuit and a plurality of switches each connected to a bit of the shift register.

9. The print head of claim 7, wherein the data stored in the first memory are combined from printing data, inner-block dispersion compensation data and inter-block dispersion compensation data.

10. The print head of claim 7, wherein the first memory stores both gray scale printing date and inner-block dispersion compensation data, and the first fetching circuit is configured to sequentially fetch the gray scale printing data and the inner-block dispersion compensation data, and the scanning circuit sequentially scans the current source in synchronization with the fetching of the gray scale printing data and the inner-block dispersion compensation data.

11. The print head of claim 10 further comprising:

a second memory for storing inter-block dispersion compensation data a BCD code system, and a second fetching circuit for fetching the inter-block dispersion compensation data using bit slicing from the second memory, wherein the scanning means scans the current source sequentially in synchronization with the fetching of the gray scale printing data, the inner-block dispersion compensation data, and the inter-block dispersion compensation data.

12. A print head having plural blocks each having plural light emitting bodies comprising:

a first memory for storing inner-block dispersion compensation data;

a second memory for storing inter-block dispersion compensation data;

a third memory for storing gray scale printing data;

a fetching circuit for fetching respective data stored in the first, second and third memories;

at least one variable current supply for supplying a light emitting current to each light emitting body;

a current control circuit for changing the light emitting current by controlling the variable current supply according to the fetched data from the first memory and the second memory; and a light emitting time control circuit for controlling periods of the light emitting current of the variable current supply according to the fetched data from the third memory.

13. The print head of claim 12, wherein the first, second and third memories store the respective data in a BCD code system, wherein the fetching circuit is configured to fetch respective data using bit slicing from the first, second and third memories sequentially, wherein the current control circuit controls the variable current supply to change the size of the light emitting current according to the significance of each bit in the BCD code system, wherein the light emitting time control circuit comprises at least one pulse generator for generating pulses which change in width according to the significance of each bit of the data fetched from the third memory, and wherein the size of the current supplied by the variable current supply is substantially constant during each pulse.

14. The print head of claim 12, wherein the current control circuit comprises a shift register operated in synchronization with the fetching circuit and a plurality of switches each connected to a bit of the shift register.

15. The print head of claim 12, wherein the pulse generator comprises a DFF type shift register.

* * * * *